US005745792A

United States Patent [19]
Jost

[11] Patent Number: 5,745,792
[45] Date of Patent: Apr. 28, 1998

[54] SYSTEM FOR AUTOMATICALLY AND CONTINUOUSLY TUNING TUNABLE PARAMETERS BY SETTING TUNING MECHANISM TO TUNE A NEXT TUNABLE PARAMETER AFTER MAINTAINING MEANS MAINTAINED PARAMENTER CHANGE

[75] Inventor: Larry T. Jost, St. Louis, Mo.

[73] Assignee: SBC Technology Resources, Inc., Austin, Tex.

[21] Appl. No.: 235,857

[22] Filed: Apr. 29, 1994

Related U.S. Application Data

[63] Continuation-in-part of Ser. No. 53,655, Apr. 29, 1993, abandoned.

[51] Int. Cl.⁶ ................................................ G06F 13/10
[52] U.S. Cl. .................................... 295/878; 395/839
[58] Field of Search ........................... 395/500, 575, 395/425, 250

[56] References Cited

U.S. PATENT DOCUMENTS

| | | | |
|---|---|---|---|
| 4,399,503 | 8/1983 | Hawley | 395/440 |
| 4,433,374 | 2/1984 | Hanson et al. | 395/965 |
| 4,489,378 | 12/1984 | Dixon et al. | 395/853 |
| 4,530,055 | 7/1985 | Hamstra et al. | 395/463 |
| 4,811,203 | 3/1989 | Hamstra | 395/469 |
| 4,860,193 | 8/1989 | Bentley et al. | 395/250 |
| 5,091,846 | 2/1992 | Sachs et al. | 395/250 |
| 5,210,829 | 5/1993 | Bitner | 395/250 |
| 5,241,666 | 8/1993 | Idleman et al. | 395/872 |
| 5,253,351 | 10/1993 | Yamamoto et al. | 395/445 |
| 5,357,623 | 10/1994 | Megory-Cohen | 395/456 |
| 5,375,216 | 12/1994 | Moyer et al. | 395/450 |
| 5,381,539 | 1/1995 | Yanai et al. | 395/425 |

FOREIGN PATENT DOCUMENTS

| | | |
|---|---|---|
| 0586117 | 3/1994 | European Pat. Off. |
| 1231570 | 5/1971 | United Kingdom . |
| 1310467 | 3/1973 | United Kingdom . |
| 89/09468 | 10/1989 | WIPO . |

OTHER PUBLICATIONS

United Kingdom Search Report.
APS 7800 Software Release Documentation Revision 7.7 (Apr. 14, 1994).
Jay L. Devore, "Probability of Statistics for Engineering and Sciences," Brooks/Cole Publishing Co., Monterey CA (1982). pp. 237–248.

Primary Examiner—Thomas C. Lee
Assistant Examiner—Anderson I. Chen
Attorney, Agent, or Firm—Greenblum & Bernstein, P.L.C.

[57] ABSTRACT

Tuning mechanisms are provided for tuning tunable parameters of a memory subsystem's cache. A simplified tuning mechanism switches drain mechanisms on and off depending upon the amount of updated buffers present within the cache at a particular time. The drain mechanisms may include a drain-on-read module and a drain-on-write module. In addition, a tuning mechanism automatically and continuously tunes tunable parameters of a storage control processor, by measuring durations of I/O processing events being performed by the storage control processor, and gathering sample values which form sample sets based upon the durations measured. After a first sample set is obtained, a tunable parameter is changed by incrementing or decrementing the parameter by a pre-defined delta value. A second sample set is then obtained after the parameter was changed. Once the second sample set is obtained, the I/O events that were measured to obtain the first sample set are compared to the I/O events that were measured to obtain the second set in order to determine if the mixtures of I/O events are similar. If the mixtures of I/O events of the first sample set are similar to those of the second set, a determination is made as to whether there was an overall decrease in the lengths of durations of I/O processing events measured after the parameter was changed. The parameter change is maintained if it is determined that there was an overall decrease in the lengths of I/O processing event durations measured after the parameter was changed.

84 Claims, 17 Drawing Sheets

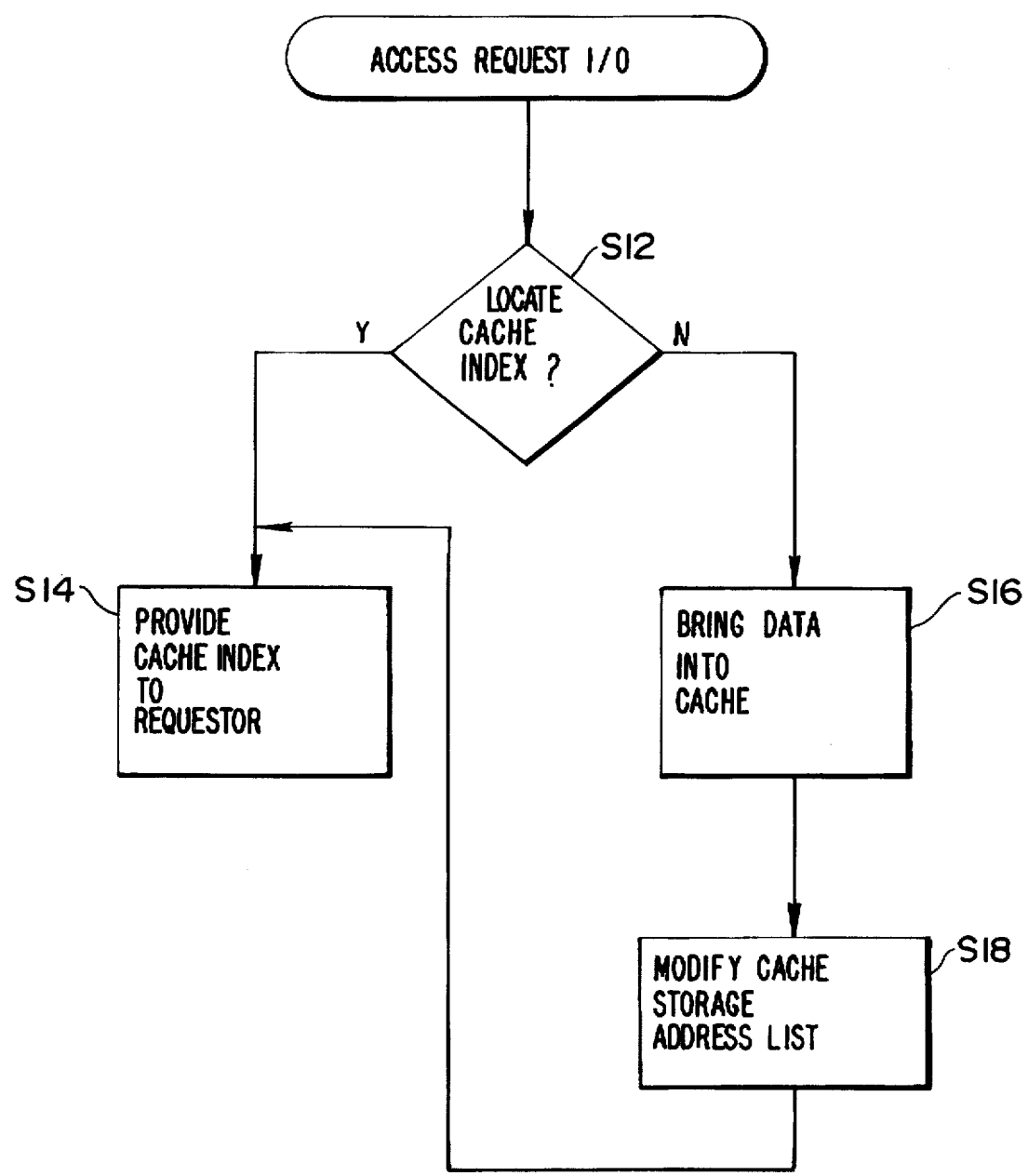

SYSTEM FOR AUTOMATICALLY AND CONTINUOUSLY TUNING TUNABLE PARAMETERS BY SETTING TUNING MECHANISM TO TUNE A NEXT TUNABLE PARAMETER AFTER MAINTAINING MEANS MAINTAINED PARAMENTER CHANGE

CONTINUING AND RELATED APPLICATION DATA

This is a continuation-in-part application of U.S. patent application Ser. No. 08/053,655, filed on Apr. 29, 1993, now abandoned, the content of which is expressly incorporated herein by reference in its entirety. In addition, this application is related to pending U.S. patent application Ser. No. 08/235,714, entitled "Memory Subsystem with Disk Meshing, Controller Meshing, and Efficient Cache Buffer Lookup," filed on Apr. 29, 1994, now U.S. Pat. No. 5,671,385, and is further related to pending U.S. patent application Ser. No. 07/882,010, entitled "Open Architecture Interface Storage Controller," filed on May 13, 1992, now abandoned. The contents of each of these above-noted related applications are expressly incorporated by reference herein in their entireties.

BACKGROUND OF THE INVENTION

1. Copyright Notice

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

2. Field of the Invention

The present invention is related to a memory sub-system for managing the transfer of data between at least two memories. More specifically, the present invention is directed to a memory sub-system with a cache, and a tuning mechanism for tuning/adjusting system parameters which control the manner in which the cache is used.

3. Discussion of Background Information

Cached data transfer memory sub-systems are utilized in computer systems which have multiple data stores (at least a first level memory and a second level memory) which have different access rates. Data is "cached" into a storage that has a faster access time in order to reduce the need to access another storage which will take longer to access the required data. Some existing memory sub-systems have cache parameter tuning mechanisms; however, such tuning mechanisms only allow manual tuning/adjustment of cache parameters or can automatically adjust only a limited number of cache parameters. For example, U.S. Pat. No. 4,489,378 discloses a mechanism for automatically adjusting the quantity of prefetch data in a cache operation.

Most memory sub-systems, whether they be for a mainframe computer, or a smaller computer such as a personal computer, are written for specific hardware architecture and/or for specific applications. Thus, such memory sub-systems seldomly have adjustable cache parameters. Since such memory subsystems are tailored to specific hardware architecture and/or applications, there is no need to adjust or change the parameters of the cache system to increase efficiency.

SUMMARY OF THE INVENTION

In view of the above, the present invention, in one or more of its various aspects and/or embodiments, is thus presented to bring about one or more objects and advantages, such as those noted below.

It is an object of the present invention to provide a memory sub-system that will attempt to optimally perform cached data transfers in different system environments (with different hardware architectures and/or applications) and with changing I/O demands being placed on the sub-system. Accordingly, it is an object to provide a tuning mechanism for intelligently and automatically tuning the cache parameters of such a memory sub-system.

It is a further object of the present invention to provide a tuning mechanism which can adjust a broad range of cache parameters of the memory sub-system.

It is a further object of the present invention to provide a tuning mechanism that does not detract from or hinder other storage management operations being performed by the sub-system. Accordingly, it is an object of the present invention to automatically adjust configuration parameters without performing complicated and time consuming calculations. In addition, it is an object of the present invention to provide a tuning mechanism that eventually corrects an erroneous parameter adjustment that may be made, and that minimizes the impact of adjustment errors when they occur.

The present invention, therefore, is directed to a tuning system provided for automatically tuning tunable parameters of a storage control processor provided in a data processing system, where the data processing system has a cache and a long-term storage. Durations of I/O processing events being performed by the storage control processor are measured, a statistical evaluation of the I/O performance of the storage control processor is performed based upon the measured durations, and a tunable parameter is modified based upon said statistical evaluation. In a more specific aspect, the present invention is directed to a data processing system and one or more sub-components thereof. The data processing system includes a processor, a hierarchical memory system, a storage control processor (which may comprise a mainframe storage controller), and a tuning mechanism for automatically and continuously tuning tunable parameters of the storage control processor. In addition, the present invention is directed to the method performed by the data processing system, and one or more sub-methods thereof.

The processor operates on various data and comprises a processor memory and a mechanism for specifying an address that corresponds to a requested data block located within another memory to be accessed by the processor. The hierarchical memory system comprises a cache and a long-term storage. The storage control processor provides processor access to the requested data block within the cache, transfers data between the processor memory and the cache, and transfers data between the cache and the long-term storage.

The tuning mechanism includes a mechanism for measuring durations of I/O processing events being performed by the storage control processor to obtain sample sets based upon the measured durations. A first sample set is obtained by the tuning mechanism, and then a parameter of the storage control processor is changed by incrementing or decrementing the value of the parameter by a pre-defined A value. After the parameter has been changed by a pre-defined A value, a second sample set is obtained. The I/O events measured to obtain the first sample set are then compared to the I/O events measured to obtain the second sample set in order to determine if the mixtures of I/O events are similar. When the first and second sample sets have similar I/O event mixtures, a determination is made as to whether there was an overall decrease in the lengths of I/O processing event durations being measured after the parameter was changed. The parameter change is maintained if it is determined that there was an overall decrease in the lengths of I/O processing event durations after the parameter was changed.

The measured durations may be the wall-time durations of each I/O processing event. Each I/O processing event may include a processing of a channel command by a channel command interpreter provided in the storage control processor. The measuring mechanism may be provided with a mechanism for accumulating the measured I/O processing event durations to form an accumulated duration sample, each sample set comprising a limited number of accumulated duration samples. Each sample set may include three accumulated duration samples, and each accumulated duration sample may be formed by accumulating, e.g., approximately 1000 I/O processing event durations.

While acquiring the first and second sample sets, the data processing system may form an I/O event mixture value which represents types of I/O processing events which are being measured, so that a first I/O event mixture value is formed based upon the first sample set and a second I/O event mixture value is formed based upon the second sample set. The first I/O mixture value is then compared with the second I/O event mixture value in order to determine if the first and second sample sets have similar I/O event mixtures.

According to a further aspect of the data processing system, accumulated duration samples of the second sample set are compared to accumulated duration samples of the first sample set in order to determine if there was an overall decrease in the lengths of I/O processing event durations being measured after the parameter was changed. The tuning mechanism may be set to tune a next tunable parameter of a storage control processor after a parameter change has been maintained for a particular tunable parameter. In addition, changing of a tunable parameter may be inhibited when such a change would bring the parameter outside of a predetermined allowed range for that parameter.

In accordance with a further aspect of the data processing system, a mechanism may be provided for continuously setting the tuning mechanism to tune another tunable parameter, and for reinitiating operation of the tuning mechanism to tune the other tunable parameter.

In accordance with a further aspect of the invention, the parameter change may be reverted if it is determined that there was no overall decrease in the lengths of I/O processing event durations after the parameter was changed in one direction and in an opposite direction.

Each of the mixtures of I/O events for each sample set may be represented by a mix ratio accumulated value for each sample, which is formed by accumulating into the accumulator a predetermined value when one type of I/O event is measured, and by subtracting from the accumulator a predetermined value when another type of I/O event is measured.

The one type of I/O event may comprise a write operation being performed by the storage control processor. The other type of I/O event may comprise a read operation being performed by the storage control processor.

In order to determine if the mixtures of I/O events of the first and second sample sets are similar, a mix ratio hypothesis test may be performed, which includes calculating a relationship between the mix ratio accumulated values of the first sample set and the mix ratio accumulated values of the second sample set, as a function of the variability of the mix ratio accumulated values of one of the first and second sample sets and the respective means of the mix ratio accumulated values of each set. In this regard, the variability $x_{\bar{x}}$ of a given sample set is the mean of the absolute deviations from the mean $\bar{x}$ of the mix ratio accumulated values in the given sample set. More particularly, the mix ratio hypothesis test may comprise determining whether or not the following condition is true:

$$(\bar{x} - n_{\bar{x}})_{first\ set} \leq (\bar{x})_{second\ set} \leq (\bar{x} + mx_{\bar{x}})_{first\ set}.$$

In order to determine if there was an overall decrease in the lengths of I/O processing event durations being measured, an accumulated duration hypothesis test may be performed which includes calculating a relationship between the accumulated duration samples of the first sample set and the accumulated duration samples of the second sample set, as a function of the variability of the accumulated duration samples of one of the first and second sample sets and the respective means of the accumulated duration samples of each set. The variability $x_{\bar{x}}$ of a given sample set may be determined to be the mean of the absolute deviations from the means $\bar{x}$ of the accumulated duration samples in the given sample set. More particularly, the accumulated duration hypothesis test may include determining if the following relationship is true:

$$(\bar{x})_{second\ set} \leq (\text{larger of 0 and } \bar{x} - nx_{\bar{x}})_{first\ set}.$$

In accordance with another embodiment of the present invention, a data processing system may be provided which includes a processor that operates on various data, includes a processor memory, and specifies an address that corresponds to a requested data block located within another memory to be accessed by the processor. The data processing system may be further provided with a hierarchical memory system comprising a cache and a long-term storage, along with a storage control processor which provides processor access to the requested data block within the cache, transfers data between the processor memory and the cache, and transfers data between the cache and the long-term storage. In the data processing system, a drain mechanism is provided for draining the cache by writing a plurality of blocks from the cache to the long-term storage upon the occurrence of a predetermined event. In addition, a tuning mechanism is provided for automatically and continuously controlling whether the drain mechanism is ON or OFF. The tuning mechanism may configured so that it determines if the current amount of updated buffers in the cache exceeds a drain threshold value, turning the drain mechanism ON when the current amount of updated buffers exceeds the drain threshold value, and turning the drain mechanism OFF when the current amount of updated buffers does not exceed the drain threshold value.

If the drain mechanism comprises a drain-on-read module, and the predetermined event comprises a determination that the storage control processor has instructed a physical read from the long-term storage to the cache, the drain threshold value may be set to a drain-on-read threshold value. If the drain mechanism is a drain-on-write module, and the predetermined event comprises a determination that the storage control processor has instructed a physical write of data from the cache to the long-term storage, the drain threshold value may be set to a proportion of a drain-on-read threshold value.

The above-listed and other objects, features and advantages of the present invention will be more fully set forth hereinafter.

BRIEF DESCRIPTION OF THE DRAWINGS AND APPENDICES

The present invention is further described in the detailed description which follows, by reference to the noted plurality of drawings by way of non-limiting examples of embodiments of the present invention, in which like reference numerals represent similar parts throughout the several views of the drawings, and wherein:

FIG. 3 is a flow diagram that illustrates the steps performed during execution of an access request I/O operation in response to an access request made by a requesting host processor (requester);

Figure 6A:
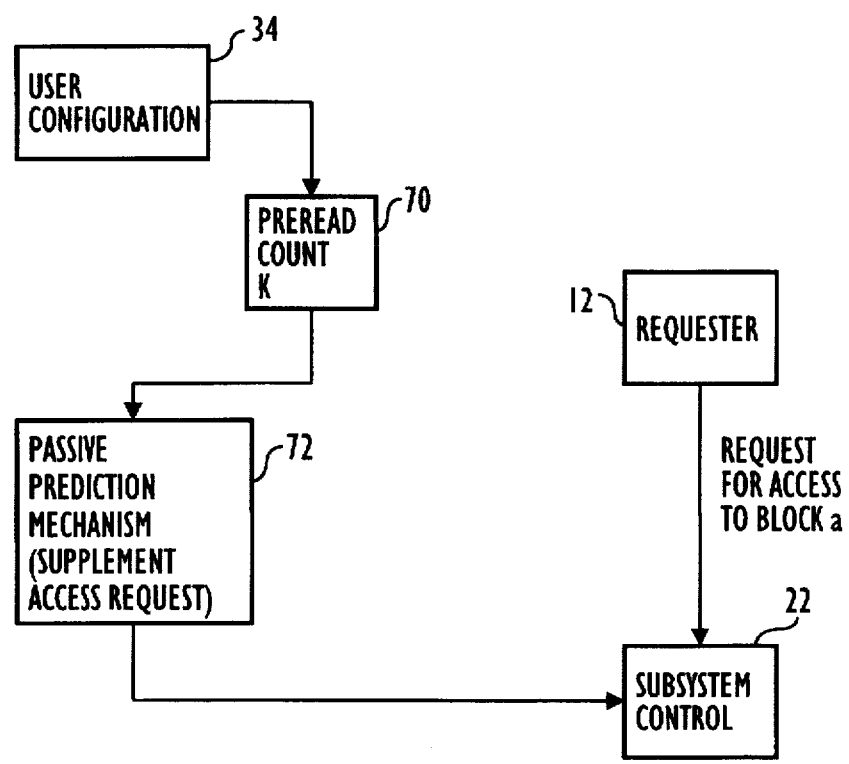
Figure 6B:
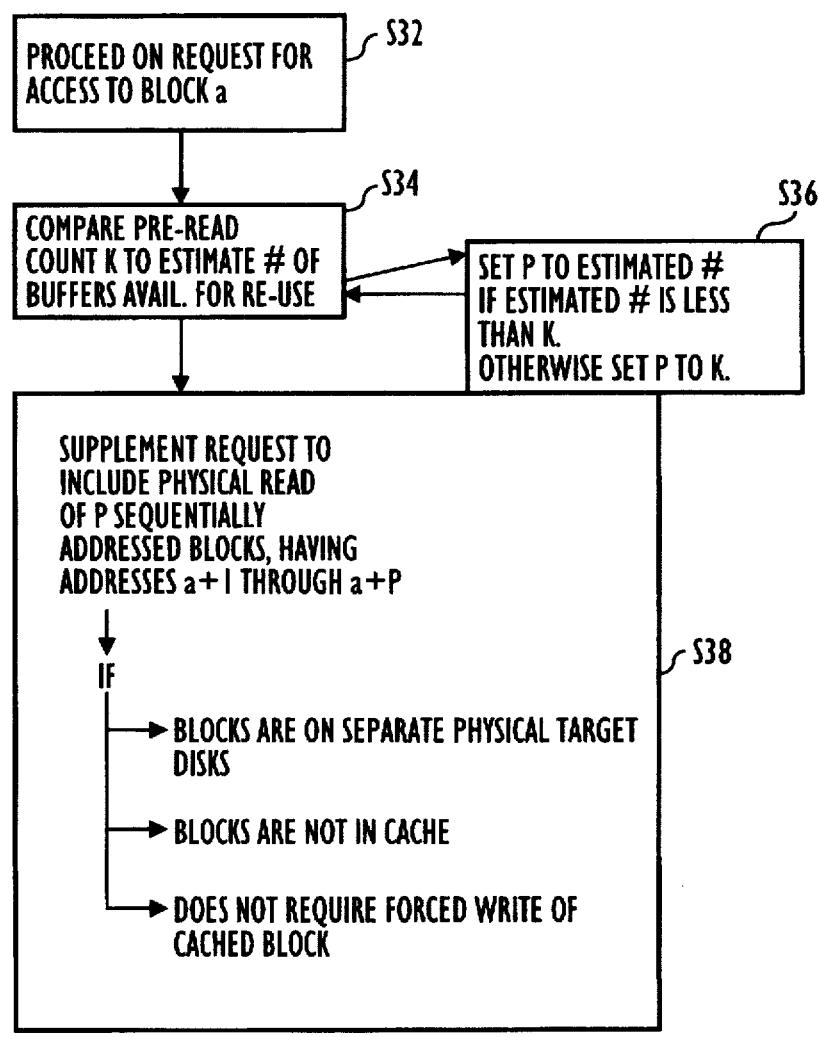
Figure 7A:
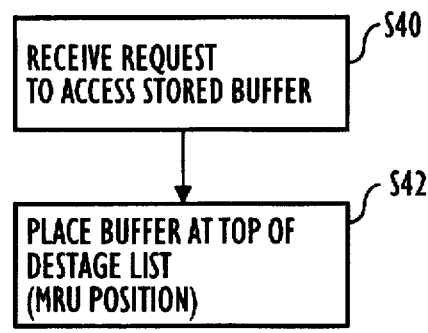
Figure 7B:
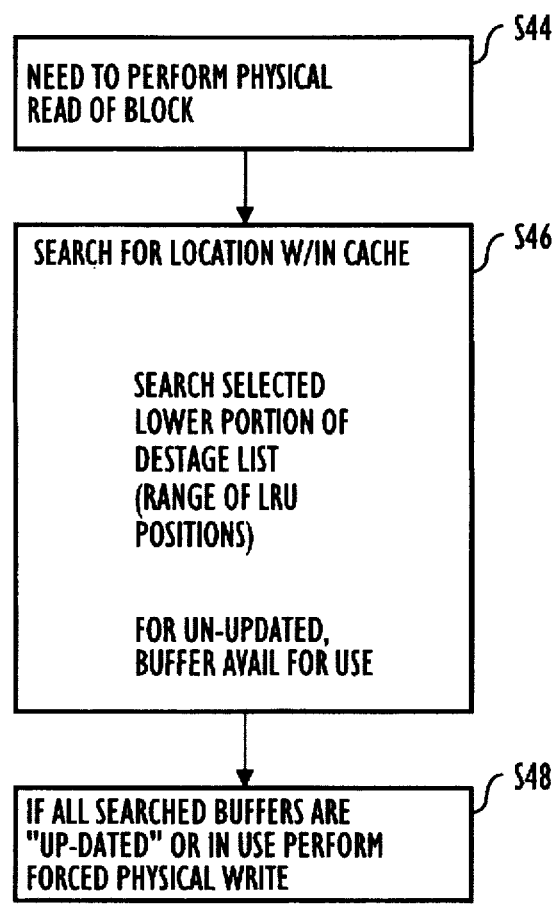
Figure 8:
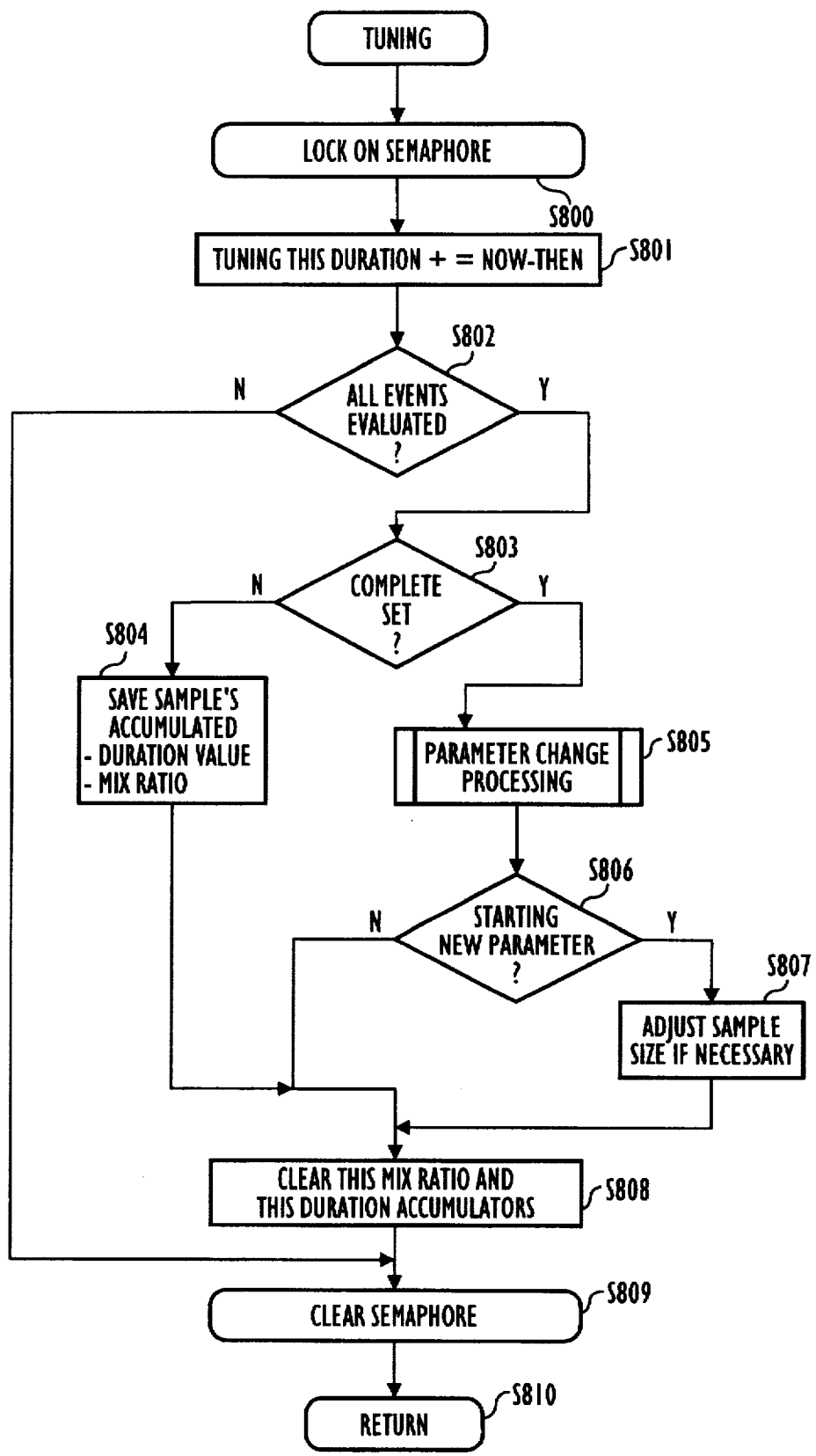
Figure 9:
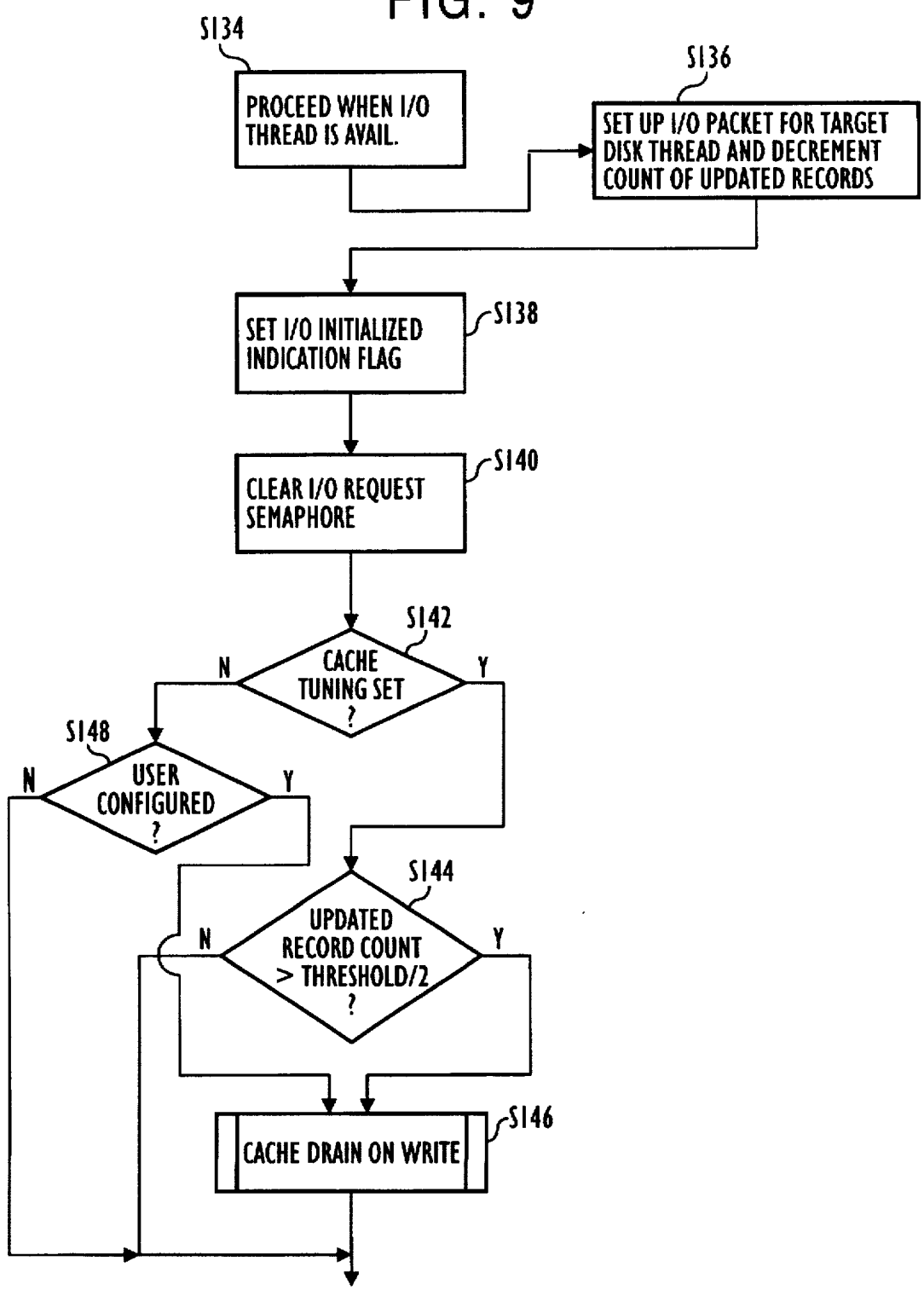
Figure 10:
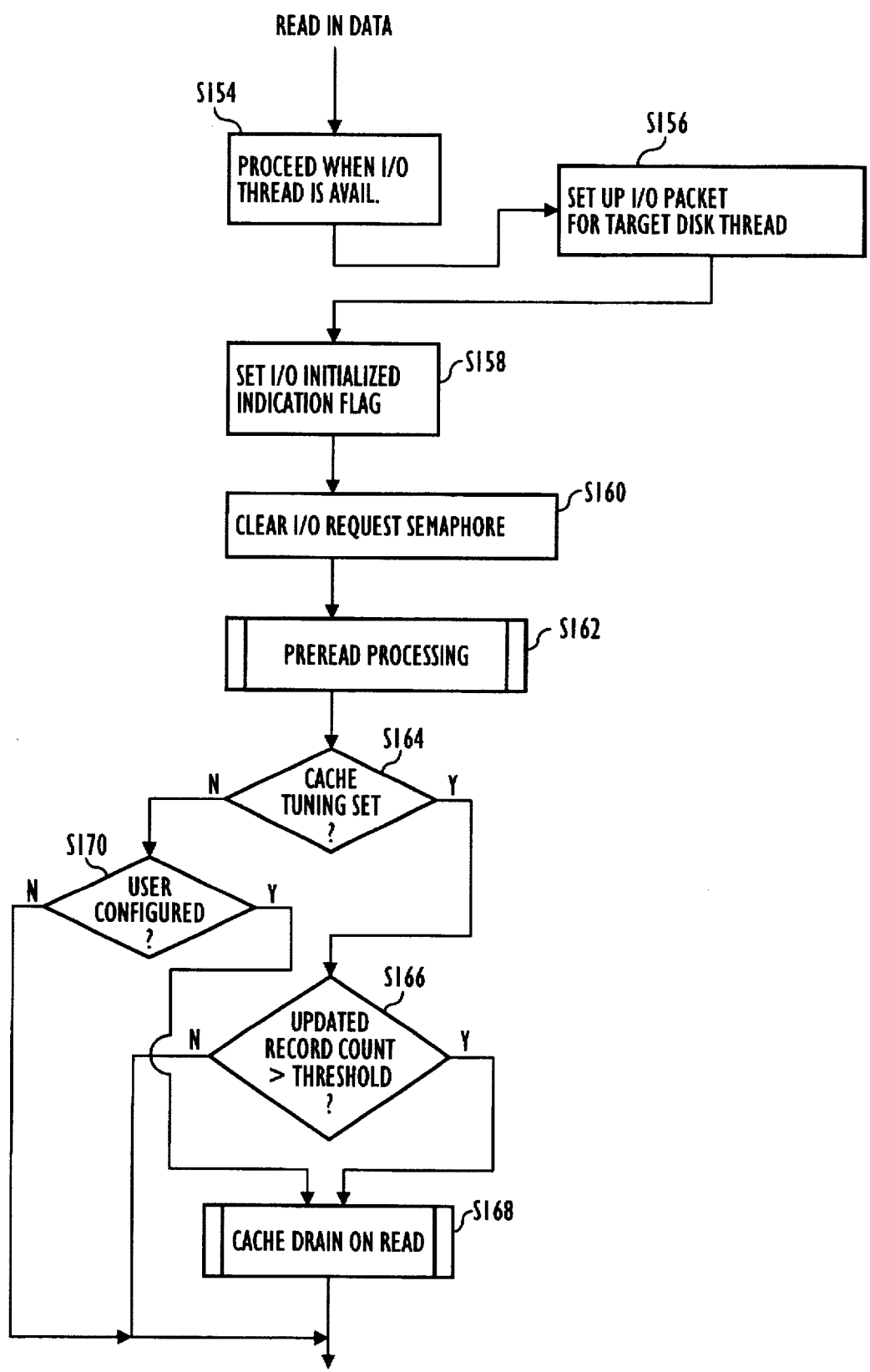

FIGS. 5A–5G collectively illustrate a flow diagram of the steps performed by the tuning mechanism of the illustrated embodiment;

FIG. 6A is a functional block diagram illustrating the various function modules of a passive prediction caching system of the illustrated embodiment;

FIG. 6B is a flow diagram illustrating the various steps performed by the subsystem control mechanism of the illustrated embodiment during execution of a pre-read processing;

FIGS. 7A and 7B are flow diagrams that illustrate the steps performed by the subsystem control mechanism which relate to the preservation of frequently accessed data within the cache;

FIG. 8 is a general flow diagram which illustrates the main steps performed by the tuning mechanism of the illustrated embodiment;

FIG. 9 illustrates a portion of a forced physical write process performed by the sub-system control mechanism of the illustrated embodiments; and FIG. 10 is a partial flow diagram of a read process performed by the storage subsystem control mechanism of the illustrated embodiment.

Appendices A and B are program listings in C which are provided to exemplify a particular implementation of a tuning mechanism of the present invention.

DETAILED DESCRIPTION OF ILLUSTRATED EMBODIMENTS

Figure 1:
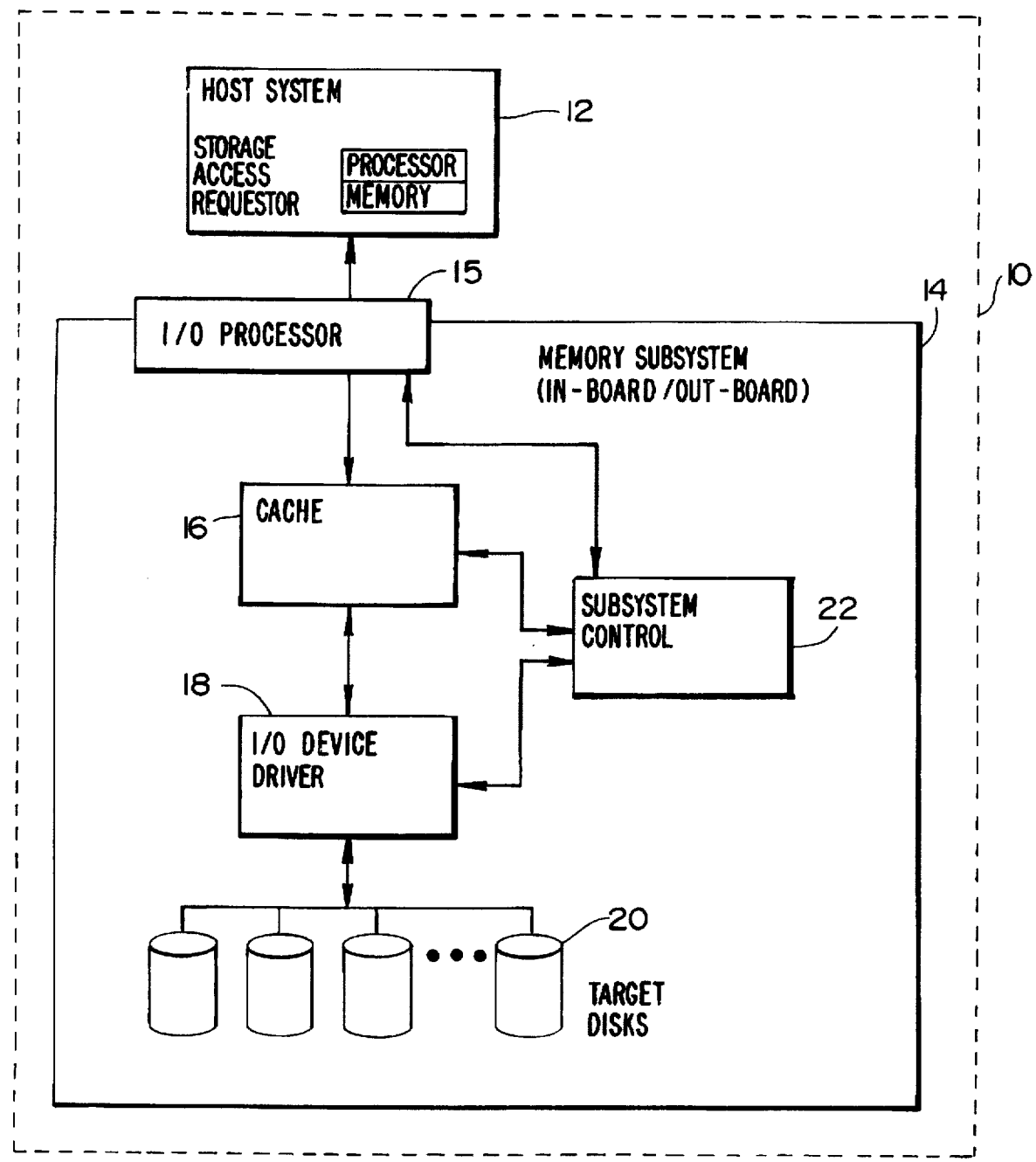
FIG. 1 illustrates a system diagram of a data processing system comprising several elements of an illustrated embodiment of the present invention.

FIGS. 1–3, 4A, 5A–5G, 6A–6B, 7A and 8–10 illustrate an example embodiment of a tuning mechanism of the present invention and several processes/systems which pertain thereto. The illustrated tuning mechanism, shown in FIGS. 5A–5G and 8, performs several main functions in order to decide the manner in which tunable parameters of a cache memory sub-system should be adjusted in accordance with a statistical estimation of the memory sub-system's I/O performance as a result of the parameter adjustment. The tuning mechanism may be provided in a data processing system 10 as illustrated in FIG. 1, which includes a memory sub-system 14 controlled by a sub-system control mechanism 22. Sub-system control mechanism 22 may perform functions such as cache draining, passive prediction caching, frequently read data preservation, and user configuration of cache parameters.

A. The Data Processing System

FIG. 1 illustrates a data processing system 10 having a host system (storage access requester) 12 coupled to a memory sub-system 14. All or a portion of memory sub-system 14 may be provided either in-board or out-board of a host computer system such as host system 12. Memory sub-system 14 comprises an I/O processor 15, a cache 16, an I/O device driver 18, and a plurality of target disks 20. Memory sub-system 14 is also provided with a sub-system control mechanism 22 which is functionally connected to each of I/O processor 15, cache 16, and I/O device driver 18. The illustrated memory sub-system may comprise a system for performing disk meshing and flexible storage mapping with enhanced flexible caching, e.g., as disclosed in commonly assigned (parent) U.S. application Ser. No. 08/053,655, which was filed in the name of Larry Thomas JOST on Apr. 29, 1993, the content of which has been incorporated by reference herein in its entirety. In addition, the illustrated memory sub-system may be used within an emulating storage control system, as disclosed in commonly assigned U.S. application Ser. No. 07/882,010, entitled "Open Architecture Interface Storage Controller" which was filed in the names of David M. HIATT and Timothy R. KLOS on May 13, 1992, the content of which is expressly incorporated by reference herein in its entirety. It should be noted, however, that the memory sub-system and each of the subcomponents thereof may have independent significance in conjunction with other computer data processing systems and/or memory sub-systems. Thus, the storage controller of the HIATT et al. application and the storage management system of the JOST application are only examples of systems in which the present invention can be implemented.

B. Memory Sub-system Control

Figure 2:
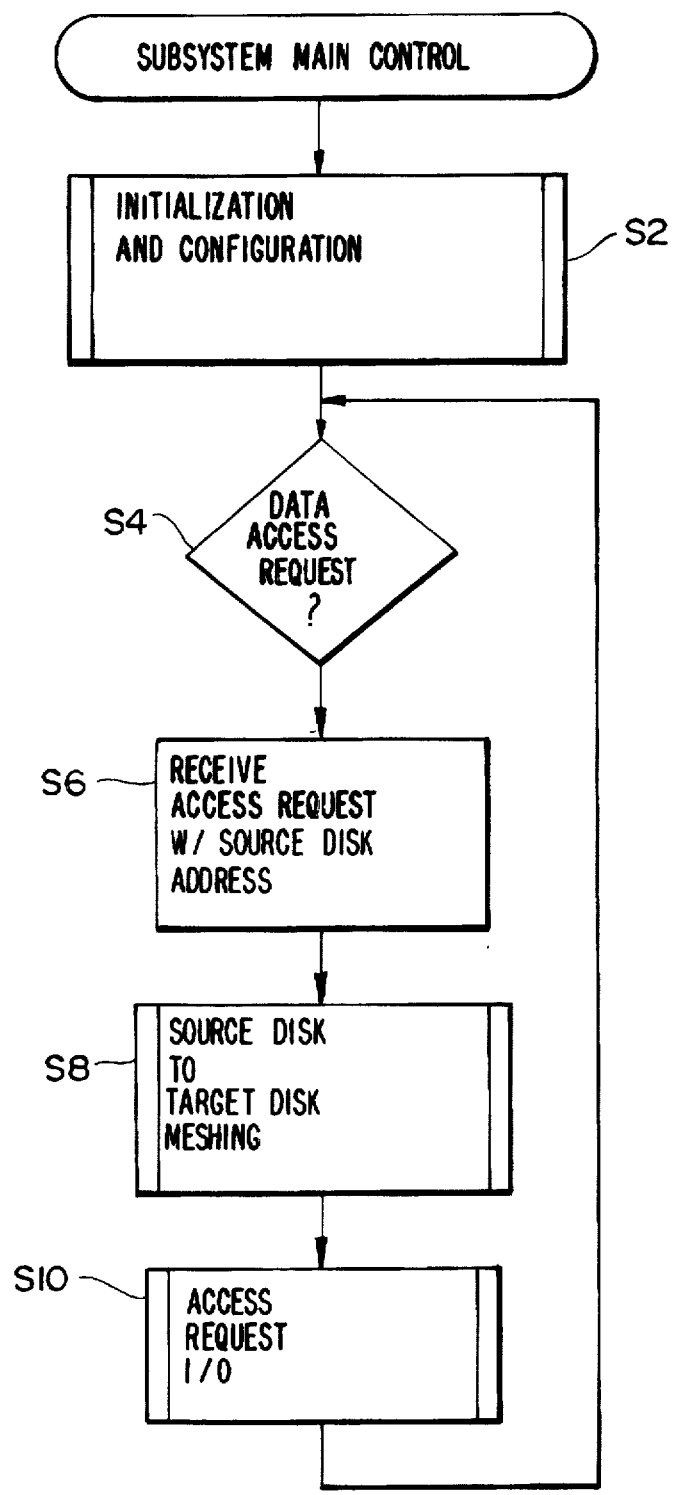
FIG. 2 is a flow diagram that illustrates the main control of the memory subsystem illustrated in FIG. 1.

The operation of memory sub-system 14 may be controlled by sub-system control mechanism 22. FIG. 2 comprises a flow diagram which illustrates several steps that may be performed by sub-system control mechanism 22. In step S2, sub-system control mechanism 22 initializes and configures the system, and thereafter proceeds to step S4, where the sub-system control awaits receipt of a data access request from the requester (host system 12). Upon receipt of a data access request, the sub-system control proceeds to step S6, at which time memory sub-system 14 receives, via I/O process 15, the access request along with a source disk address, specifying an address of the requested data in terms of the requester's addressing scheme. Subsequently, at step S8, the source disk address is mapped and meshed to obtain a target disk address corresponding to a physical target disk 20 connected to the output of I/O device driver 18. The mapping and meshing may be performed as described in Parent application U.S. Ser. No. 08/053,655, or as described in a copending commonly assigned U.S. patent application Ser. No. 08/235,714, entitled "Memory Sub-system with Disk Meshing, Controller Meshing, and Efficient Cache Buffer Lookup," filed on Apr. 29, 1994, in the name of Larry T. JOST, the content of which have already been expressly incorporated by reference herein in their entireties.

Upon completing the meshing of the address specified by the requester in step S8, the process proceeds to step S10, where the necessary access request I/O processing is performed, e.g., as illustrated in FIG. 3. Thereafter, the control returns to step S4, where the system awaits a further data access request.

FIG. 3 is a flow diagram which may represent, in general terms, the access request I/O processing that is referred to in step S10 of FIG. 2. The flow diagram in FIG. 3 demonstrates the general cache and storage retrieval operations of the illustrated system. Upon receiving a request for access to a particular data block from the requester, the data access request I/O processing is activated, and a determination is made in step S12 as to whether the requested data block is located within the cache. The process determines whether a cache index corresponding to the data block is located within the cache storage address list. If the cache index for the requested data block is found, the system will await any pending I/O to the requested block's cache buffer and then, in step S14, the cache index is provided to the requester.

On the other hand, if the cache index is not located within the cache, meaning that the data block is not in the cache and must be retrieved from the physical long-term storage, the process proceeds to step S16 and the data is brought into the cache. The storage address list of the cache is appropriately modified in step S18, and the cache index is provided to the requester in step S14. The cache system of the present invention may be provided with several mechanisms for enhancing its efficiency, including, e.g., making data readily available to the requester, and keeping space within the cache so that the requester will have room to accept data being forwarded by the requester to later be forwarded to the lower lever storage, such as target disks 20. In order to make the cache system work more effectively, the cache system may be provided with one or more mechanisms for minimizing the effect of physical transfer delays, i.e., I/O time delays, which are caused by physical transfers of data to and from target disks 20.

C. Cache Draining

A cache draining mechanism which is designed to minimize the effects of physical transfer delays may be provided in the cache system. A cache draining mechanism may be provided that drains data from cache 16 to target disks 20 under several conditions, in a manner which does not interfere with I/O requests made by requester 12. For example, the data may be drained when it must be drained, in order for an access request to be satisfied by memory sub-system 14. Such a "must" drain (a forced physical write) occurs when there is not sufficient available space within cache 16 to place a requested data block for subsequent access by requester 12. There is not sufficient space within the cache when there is no reusable block within the cache which could be reused without first being written out.

Figure 4A:
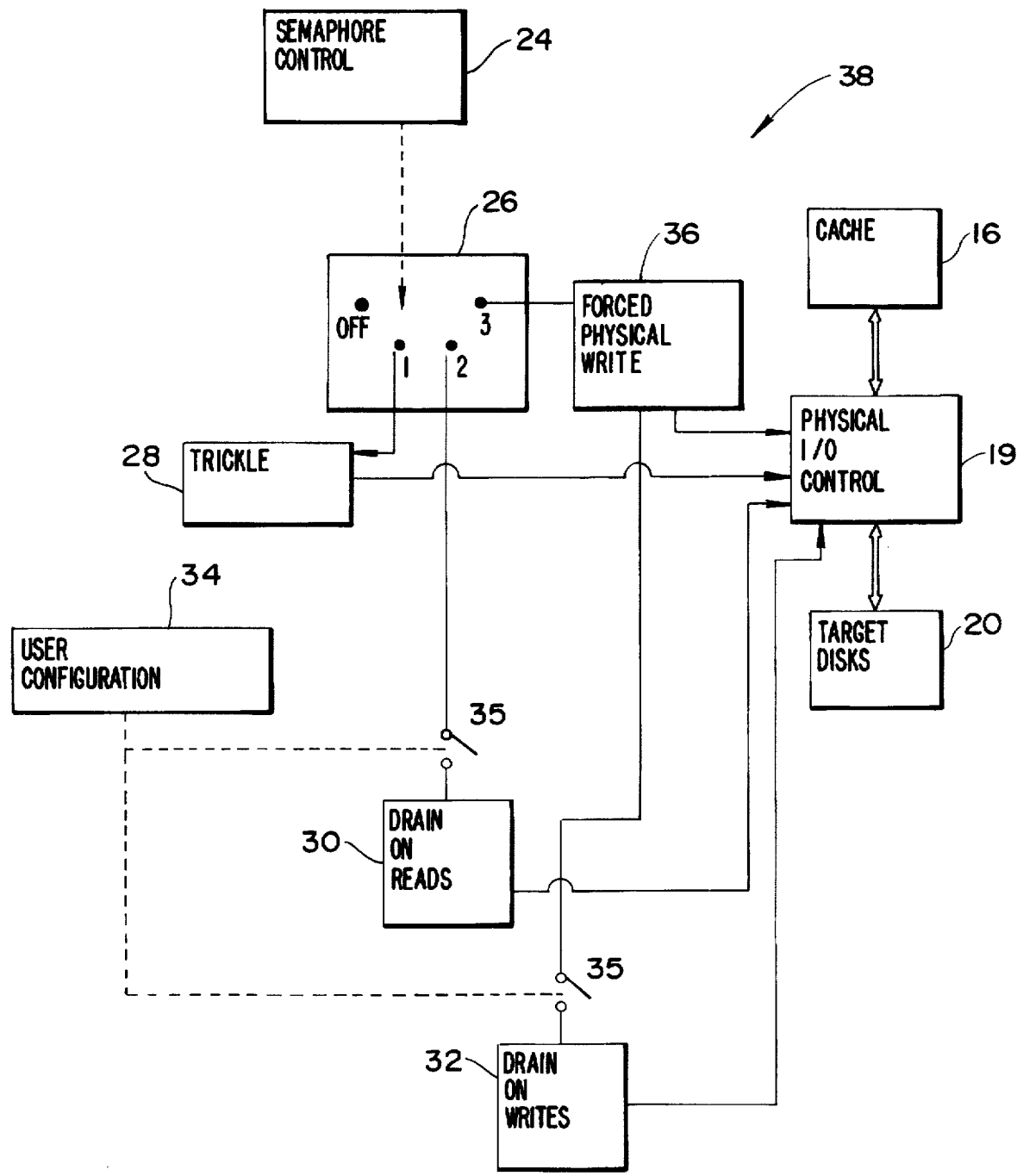
FIG. 4A is a functional block diagram illustrating the various function modules of the cache drain mechanism of the illustrated embodiment.

FIG. 4A illustrates a particular implementation of a draining mechanism 38 which may be provided in the memory sub-system illustrated in FIG. 1. A software implemented semaphore control mechanism 24 is coupled to a drain condition switch 26, which in turn is connected to several drain condition modules. Each of three positions of drain condition switch 26 is respectively connected to a trickle module 28, a drain-on-read module 30 (via switch 35A), and a forced physical write module 36. Forced physical write module 36 is also connected to a drain-on-write module 32 (via switch 35B). The outputs of each of modules 28, 30, 32 and 36 are connected to a physical I/O control module 19 which is placed within the I/O path that extends between cache 16 and target disks 20. Each of trickle module 28 and forced physical write module 36 are functionally "hard-wired" to a respective switch position of drain condition switch 26. This means that each of these modules, in accordance with the illustrated embodiment, is provided as a standard feature of the illustrated cache system.

User configuration module 34 is coupled to user configuration switches 35A, 35B which each operate to functionally (respectively) connect/disconnect drain-on-read module 30 and drain-on-write module 32.

A cache drain may be performed under several conditions. Such conditions may include when the cache is performing a physical read or a physical write operation (in which case the drain will be called a drain-on-read or a drain-on-write), when there is a forced physical write to a target disk (to allocate space within the cache so that a data block may be placed within the cache), and when both the memory sub-system becomes idle and other trickle processing conditions are met (such a drain is called cache trickle processing). The drain-on-read and drain-on-write conditions are each user configurable, i.e., they can each be selected as operable by a user as desired, or automatically by a tuning mechanism as will be described herein.

D. Passive Prediction Caching

The memory sub-system 14 illustrated in FIG. 1 may be provided with a mechanism referred to herein as "passive prediction caching." With the use of passive prediction caching, non-requested data may be pre-read, i.e., prefetched, so that it will be within the cache and ready for subsequent access requests made by the requester. Passive prediction caching does not require a prediction mechanism which predicts what data will be accessed based upon the tracking of data use. Rather, a set of adjacently addressed (in source address terms) data blocks, that are adjacent (in source address terms) to a requested data block are pre-read when there is a request for access to the requested data block.

FIG. 6A shows an illustrative, but non-limiting, example embodiment of a passive prediction caching mechanism. User configuration module 34 is connected to a pre-read count storage module 70, which is in turn connected to a passive prediction mechanism 72. Passive prediction mechanism 72 is then coupled to sub-system control 22, which is also connected to, inter alia, requester 12.

In operation, requester 12 initiates a request for access to block "a". Passive prediction mechanism 72 then initiates a supplemental access request, which may entail a physical read from the target disks, based upon a block that was requested, and also based upon the user-configured (and/or automatically tuned, as will be described herein) pre-read count k (which may be referred to as "Cache_Read_Ahead_Track_Count"). Passive prediction mechanism 72 may then instruct sub-system control 22 to perform the supplemental access request.

A general flow chart of the pre-read processing, performed in connection with the passive prediction mechanism 72, is shown in FIG. 6B. At an initial step S32, of the pre-read processing, the storage sub-system control will wait for a request for access to a specified block "a". Upon receipt of such an access request, the process will proceed to step S34 where the pre-read count k ("Cache_Read_Ahead_Track_Count") will be compared to the estimated number of buffers available within the cache for immediate pre-read use. In this regard, step S36 is performed, in which a value p is set to the estimated number, if the estimated number is less than k. However, if the estimated number is equal to or greater than k, p is set to k. Thereafter, step S38 is performed in which the access request made by the requester is supplemented to include a physical read of p sequentially addressed blocks, having addresses a+1 through a+p (in terms of the storage disk block addressing scheme, as specified by the requester), if several conditions are met. The specified conditions, if not met for one of the blocks, will keep that block from being read. The specified conditions may include the following: (1) the end of a source disk address space is reached; (2) each block is not already in cache; and (3) each physical read does not require a forced write of a cached block before the pre-read block can be placed within the cache.

The pre-read processing is passive in that it performs pre-reads in response to receipt of a request for access by the requester. In addition, the pre-read processing may be configured to be highly efficient by limiting physical reads of blocks such that pre-reads are only performed if the requested blocks are on separate physical target disks. This allows physical transfers from the physical target disks to be concurrent, and thus greatly minimizes the physical data transfer time consumed by the pre-read process. The meshing of source disk blocks maximizes the probability that data blocks to be pre-read all reside on different target disks. Further, the adjacent source disk data blocks may be further meshed according to controller, so that it is probable that sequential data blocks to be pre-read will reside on disks that correspond to different disk controllers. This further enhances the efficiency of the system in pre-reading data in connection with performing a read operation.

Several safety mechanisms may be provided to ensure that the pre-read does not impinge upon updated or unupdated but frequently used data blocks that are within the cache. For example, a preserve percent number may be set which represents the percentage of buffers, starting at an MRU end of the destage table (which includes cache buffers in order from MRU to LRU) to be avoided when searching for buffers available for re-use within the cache (such number being Cache_Pre-Read_Preserve_Percent), and the number of physical reads that are performed by a pre-read process may be accordingly limited depending upon the number of available buffers that are found.

Unnecessary physical reads are preferably not performed. For example, if a block indicated by a pre-read is already in cache, it is unnecessary to read such block when performing the pre-read operation. Another time-saving aspect of the pre-read processing is that a pre-read will not be performed for a particular block if such a read requires forcing the write of a cache block. Each pre-read buffer may be indexed with an MRU position within a destage list once the corresponding physical read has been completed.

E. Frequently Read Data Preservation

Another significant feature which may be provided in the illustrated memory sub-system is frequently read data preservation. With such a feature, not only will updated cache buffers be preserved, but un-updated cache buffers that are frequently accessed by the requester will also be preserved, under several conditions. Such a feature reduces or eliminates the need to thrash in and out of cache for data which is frequently accessed but seldom or never updated. The system may be provided with a process that preserves un-updated, but frequently used, data buffers in the cache by limiting searches for available cache buffers, and by indexing the cache buffers so that the frequently used cache buffers are placed within an area of an index list which will not be searched when looking for an available cache buffer.

FIGS. 7A and 7B illustrate the relevant components of a storage sub-system control process which pertain to frequently read data preservation. In FIG. 7A, step S40 is shown to represent the point in time at which the storage sub-system control receives a request to access a storage buffer. Whenever such a request to access a storage buffer is received, the process proceeds to step S42, at which time the buffer is placed at the top of the destage list (which corresponds to the MRU position).

Referring to FIG. 7B, when a physical read of a block must be performed by the system, as determined at step S44, the process proceeds to step S46, where an appropriate cache buffer is located so that the physically read block can be placed within that cache buffer. In performing step S46, a selected lower portion of a destage list is searched which corresponds to a (user-configured) range of LRU positions. When an un-updated buffer is located within the selected lower portion of the destage list and is thus available for use, that cache buffer is chosen for the location of the physically read block. Proceeding to step S48, if all searched buffers are "updated," or in use, a forced physical write is performed.

In the process illustrated in FIGS. 7A and 7B, whenever a request is received for accessing a particular storage buffer, that buffer is placed at the top of a destage list, which corresponds to an MRU position of the destage list. Thereafter, when a physical read of a particular block is requested, the cache buffer which is used to store that physically read block will be obtained from a selected lower (LRU) portion of the destage list. Thus, frequently accessed cache buffers which would end up at or near the top of the destage list (within an MRU range of the list) will not be chosen for storage of a physically read block.

The user-configuration module of this system, described in more detail below, may be configured so that the size of the selected lower LRU portion of the de-stage table may be specified by the user, i.e., user-configurable. In the alternative, the size of the remaining MRU portion of the de-stage table may be specified by the user. Since such parameters may be user-configurable, they may be automatically tuned by means of a tuning system which will be described herein. Separate sizes may be configured for ordinary reads and for pre-reads, such sizes being assigned to variables Cache_Read_Preserve_Percent and Cache_PreRead_Preserve_Percent.

F. User Configurable Parameters

Many parameters of the above-described storage control mechanism may be configured depending on the needs of and physical constraints placed upon the data processing system. For example, parameters of the cache draining, the passive prediction caching, and the frequently read data preservation mechanisms may be configured and may be dynamically adjusted. In this regard, in accordance with a particular embodiment of the present invention, a system may be provided for automatically adjusting, i.e., tuning, various parameters of the memory sub-system 14, including parameters pertaining to the illustrated cache draining, passive prediction caching, and frequently read data preservation mechanisms.

By way of example, it is noted that the pre-read count k (assigned to a variable called Cache_Read_Ahead_Track_Count), may be automatically adjusted. The parameter Cache_Read_Preserve_Percent which represents the percentage of the destage table may be automatically adjusted, starting at MRU, that will be avoided when searching the destage table for an "available" cache buffer before writing out an updated LRU entry. Another parameter, called Cache_PreRead_Preserve_Percent may also be automatically adjusted, which represents the percentage of the destage table, starting at MRU, that will be avoided when searching the destage table for an "available" (unupdated) cache buffer to allow a pre-read to occur. Additional parameters which may be automatically and dynamically modified include a Cache_Drain_On_Read parameter which controls whether or not the system will perform a drain-on-read (0 representing an OFF condition, and 1 representing an ON condition), and a Cache_Drain_On_Write parameter which similarly controls whether the system will perform a drain-on-write.

G. Automatic Parameter Tuning

As there is considerable difficulty in planning I/O profiles and in setting cache parameters for a memory sub-system such as that disclosed in the present embodiment, in order to improve and maintain the level of I/O performance of the memory sub-system, an automatic parameter tuning mechanism may be provided. Such a tuning mechanism may be provided which modifies, in a discrete manner, tunable parameters, and which observes performance changes which have resulted from the changes to the tunable parameters. By comparing the sub-system's I/O throughput (observed using a crude statistical evaluation/approximation of the sub-system's I/O performance) before and after a tuning change is made, the parameter change is left in place, reverted, or a change of equal magnitude in the opposite direction is attempted. If a parameter change has caused an (apparent) improvement in system performance, the change is maintained. Otherwise, the change is reverted and tuning is attempted for a next automatically tunable parameter of the system. This process is continuously repeated for each of the memory sub-system's tunable parameters, when the memory sub-system 14 is in use.

In order to evaluate the I/O performance of the memory sub-system, and in order to determine if any apparent change in I/O performance of the memory sub-system is likely caused by a parameter change, a measurement is made of the duration of each of the memory sub-system's I/O processing events. The duration of each event is measured in terms of wall-time, i.e., the amount of time it takes from starting the event to finishing the event, without taking time slicing into account (which occurs when the memory sub-system processes one or more other events during an interim of the measured event, due to, e.g., multitasking by the operating system within which the memory sub-system is run). The resulting measured durations are accumulated to form an accumulated duration value, until a certain number of event durations have been measured, at which time the accumulated duration value forms a single sample. A plurality (e.g., 3) of "samples" are obtained to form a "sample set". After each sample is obtained, the accumulated duration value is reset and the durations of the necessary number of I/O-related events (e.g., 1000 per sample) are measured and accumulated to form an additional sample.

A first sample set is obtained before changing the tunable parameter. Once the first sample set without a parameter change is obtained, the parameter is changed and a second sample set is obtained with the parameter changed. The two sample sets are then compared to determine whether the mixtures of I/O events measured to form the two sample sets (represented by mix ratio values corresponding to each sample) are sufficiently similar to each other to justify assuming that the sample sets may be compared with each other in order to determine whether the sub-system's I/O performance has improved. If the mixtures of I/O events of the two compared sample sets (one before the parameter change and the other after the parameter change) are sufficiently similar, then the sample sets are compared in order to evaluate whether the subsystem's - I/O performance has improved. This is accomplished by comparing the samples of the first sample set with the samples of the second sample set.

FIG. 8 shows a general flow chart of the tuning mechanism of the illustrated embodiment of the present invention. The illustrated tuning mechanism is implemented as a routine that is called by the memory sub-system I/O control software every time that the I/O control software commences an I/O processing event (e.g., processing an I/O command issued from the requester). After being called, the tuning routine performs a first step S800, in which the tuning code is locked on a semaphore. Thereafter, in step S801, the wall time duration of a sub-system I/O-related event is accumulated into an accumulator called Tuning.ThisDuration. The resulting accumulated duration value that is obtained for a complete sample is used to make a statistical evaluation of the subsystem's - I/O performance. Thereafter, in step S802, a test is performed to see if all events of the present sample have been evaluated by the tuning code. It is noted that the tuning code monitors the duration of a given number (e.g., 1000) of system I/O events, in order to get an indication of the I/O performance of the memory sub-system. That number of events is called a sample.

Accordingly, in step S802, a test is performed to see if a complete sample has been evaluated/obtained by the tuning code. A plurality of samples (e.g., three samples) is then obtained by the tuning code to form a sample set. Thus, if it is determined at step S802 that all of the events have now been evaluated to form a complete sample, the process will then proceed to step S803, to determine if the present sample is the last sample of a set, and thus whether or not a complete set has been monitored by the tuning code.

If it is determined in step S802 that all of the events have not been evaluated to form a sample, the process will proceed directly from step S802 to step S809, at which point the semaphore for the tuning code will be cleared and the tuning code will return (at step S810) to the memory sub-system software.

For every occurrence of an I/O processing event by the memory sub-system, the tuning code is called. If the semaphore is locked when the tuning code is called, then the call to the tuning code will be placed by the operating system of the memory sub-system on a queue, and will await the next time that the tuning code semaphore is cleared, and for the return of the tuning code. The tuning code is reentered at step S800 for the next event, and the tuning semaphore code is again locked. The wall-time duration of the next event is then accumulated in step S801, then proceeding to step S802, where a test is again performed to determine if the present event is the last event of a sample. If it is not, then the tuning code again proceeds to step S809 where the semaphore is cleared and the tuning code returns. This is repeated until all of the events for a given sample are collected by the tuning code, and the durations of such events are accumulated in the accumulator Tuning.This Duration.

As noted above, once all the events of a sample have been evaluated by the tuning code, then the process will proceed from step S802 to step S803. If a complete set of samples has not yet been evaluated by the tuning code, then the process will proceed from step S803 to step S804, where the accumulated duration value and accumulated mix ratio value (which represents the mixture of I/O-related events in the present sample) are each saved. After step S804, the process proceeds to step S808, where the mix ratio and duration accumulators are cleared. This allows a duration value and a mix ratio value to each be accumulated during the evaluation of a next sample by the tuning code.

If, at step S803, it is determined that a complete set has not been evaluated by the tuning code, the process will proceed to step S805, where parameter change processing will be performed. Once an initial sample set has been obtained by the tuning code, in step S805, the tuning code will change a tunable parameter (the tunable parameter presently being tuned by the tuning code) by a certain delta value. Then, the tuning code will proceed to step S808 via step S806, and will subsequently acquire a second sample set (upon being called by the requisite amount of I/O processing events). When the tuning code returns to step S805 after the second sample set has been obtained (after changing the tunable parameter), the mixtures of events that were measured in each of the first and second sample sets are compared to determine if the first and second sample sets have the same overall mixtures of events. If they have the same overall mixtures of events, then a comparison of the two sets can be made which will likely reflect the resulting system I/O performance caused by the change in the tunable parameter. Accordingly, if the overall mixtures of events in the compared sample sets are substantially the same, in step S805, the tuning code will then roughly estimate whether the I/O performance has improved due to the change in the parameter. Depending upon whether or not there was an estimated improvement in the I/O performance of the memory sub-system, the tuning code, in step S805, will accordingly maintain the present parameter change, revert the change to the parameter value before the change, or make a reverse change in the opposite direction. Before proceeding to step S806, if a parameter change is maintained, or if the change is reverted, the tuning code is set to start tuning a next tunable parameter.

If a determination is made in step S806 that a new parameter is being started, if necessary, the sample size will be adjusted in step S807. Once the tuning code reaches step S808, the duration and mix ratio accumulators will be cleared, so that a next sample set may be obtained by the tuning code starting with a first sample when the tuning code is called by the next I/O event.

The durations of I/O processing events being performed by the memory sub-system, which comprise a crude approximation of the system's I/O performance, are continuously sampled. A large number of I/O processing event durations (e.g., 1000) is obtained to form a sample. Several samples are obtained to form a sample set (e.g., 3 samples) of data that represents I/O performance of the sub-system. Changes in I/O profiles of the system are detected by obtaining a mix ratio value representative of the mixture of I/O processing events in each sample, in order to estimate if performance changes are due to parameter tuning or are due to I/O profile changes. Hence, the tuning mechanism can estimate the I/O performance of the sub-system even as I/O characteristics change, and make parameter adjustments accordingly. The tuning mechanism of the present invention makes an incremental Δ change to a parameter and performs a statistically-based "fuzzy" I/O performance evaluation, in order to determine whether or not the parameter change should be maintained depending upon whether the parameter change caused an estimated improvement in system performance. Decisions are not made based upon complete system information; the statistical evaluation of system performance is crude and thus is not always correct. For example, the system might revert a parameter change when the change actually improved system performance, and might maintain a parameter change, when the change actually worsened system performance. Such errors in the tuning process, however, are limited by certain safeguards provided within the process. The increment Δ by which a parameter change will be made at any given time is limited. In addition, if any additional changes are made to the same parameter, a statistically-based I/O performance evaluation will again be performed. This may result in the parameter being changed in a direction opposite to the change previously made to the parameter; accordingly, the tuning code is designed so that it will correct erroneous parameter changes eventually. By continuously making changes to tunable parameters and evaluating the resulting I/O performance to verify each parameter change, the overall system performance is improved, even when the system is subject to dynamic/changing system loadings.

FIGS. 5A–5G illustrate a particular embodiment of tuning code which may be provided to perform the main functions of the tuning system of the present invention in a particular context, i.e., in a PC-emulated storage controller as disclosed in pending (parent) U.S. patent application Ser. No. 08/053,655, commonly assigned co-pending U.S. patent application Ser. No. 07/882,010, and/or an APS 7800 level 341 PC-emulated storage controller as described, e.g., in APS 7800 Software Release Documentation Revision 7.7 (Apr. 14, 1994), ©Southwestern Bell Technology Resources, Inc. The Software Release Documentation is hereby expressly incorporated by reference herein in its entirety.

While the tuning flow illustrated in FIGS. 5A–5G has many details and is disclosed to be implemented in a specific emulated mainframe storage controller sub-system, it should be noted that many functions, components and sub-components thereof may be implemented in different contexts, and thus can have uses independent of the implementations specifically described in connection with the present embodiments.

Source code listings in C are provided in Appendices A and B that correspond to the tuning code illustrated in FIGS. 5A–5G. The following Table is provided to indicate lines of code in Appendix B that generally correspond to the steps illustrated in the flow chart of FIGS. 5A–5G.

| FIGS. 5A–5G Illustrated Flow Chart (steps) | Appendix B Source Code (lines) |
|---|---|
| S501 | 1–14 |
| S502 | 1 |
| S503 | 15 |
| S504 | 17 |
| S505 | 18 |
| S506 | 19 |
| S507 | 23–29 |
| S508 | 29 |
| S509 | 30–99 |
| S510 | 101 |
| S511 | 103 |
| S512 | 105 |
| S513 | 112 |
| S514 | 113,117 |
| S515 | 115–117 |
| S516 | 119–123 |
| S517 | 126–135 |
| S518 | 137–140 |
| S519 | 142–143 |
| S520 | 146–149 |

| FIGS. 5A–5G Illustrated Flow Chart (steps) | Appendix B Source Code (lines) |
|---|---|
| S521 | 153–161 |
| S522 | 162 |
| S523 | 164 |
| S524 | 166–194 |
| S525 | 195–196 |
| S526 | 200–227 |
| S527 | 228–229 |
| S528 | 232–257 |
| S529 | 260–261 |
| S530 | 265–267 |
| S531 | 290–319 |
| S532 | 269–288 |
| S533 | 320–321 |
| S534 | 323–325 |
| S535 | 328–347 |
| S536 | 348–351 |
| S537 | 354–373 |
| S538 | 374–384 |
| S539 | 386 |
| S540 | 388–389 |
| S541 | 391–392 |
| S542 | 394–399 |
| S543 | 407–408 |
| S544 | 412–415 |
| S545 | 417 |

Referring to FIGS. 5A–5G, a detailed tuning flow and function diagram is illustrated. In a first step S501, the system initializes local variables. This is performed one time during compilation of the code. In this step, local variables are set to an initial value. The tuning code may be called (in step S502) from a channel command interpreter of the storage sub-system such as the one disclosed in related application Ser. No. 07/882,010 (noted previously). An ID NUMBER which is the relative number of a mainframe disk (3380) unit will be passed in step S502. A counter value (which will also be passed in step S502) is a sequentially incremented value indicating the total number of channel commands processed on the memory sub-system 14. The command interpreter of the memory sub-system will reset the counter to zero every billion or so commands in order to avoid an overflow condition.

Values including, e.g., SampleCounter, PriorCounter, NextCounter, ResetDesired, and PriorSampleSize, are set to zero in order to provide a clean starting point for the same. An additional variable FirstTimeThrough is initially set to 1, which signifies a logical "TRUE," so that the initialization code can be triggered. Setting of the local variables at compile time ensures that the memory areas allocated to store these variables are initialized with desired values prior to activating the tuning code.

In order to start the tuning code, in step S502, a tuning request is forwarded from a command interpreter of the memory sub-system. The command interpreter automatically calls the tuning system when an ending status is presented by the command interpreter for processing of a given channel command. This is done by every command interpreter thread of the storage controller for every command completed. There is a command interpreter thread for each mainframe disk for each mainframe channel. By being started when the channel command presents an ending status, the tuning code will know at what point in time the command processing by the command interpreter has ended, and thus may determine the wall-time duration of the I/O processing event being performed by the command interpreter (which comprises processing of the channel command), by comparing this end time to the time when the command was initiated to the command interpreter.

In step S503, a semaphore is locked in order to ensure that only one version of the tuning code is processing at a given time. The tuning system may not be activated further while the semaphore is locked. This feature is important since I/O processing event duration variables, and other variables, are utilized in common (in the illustrated embodiment) to the entire storage system. Thus, only one copy of the tuning code should be executed at any given time.

In step S504, a determination is made as to whether a Counter value passed from a calling unit (i.e., the command interpreter) has been reset, and thus is less than the Counter value that was forwarded the last time the tuning code was entered (the counter value that was last forwarded being PriorCounter). The Counter value is a variable that is incremented by 1 with each command processed by any command interpreter thread. In the illustrated embodiment, the Counter value will be reset to 0 every billion or so commands processed by the Command Interpreter in order to avoid an overflow condition. If it is determined at step S504 that the Counter value is less than the PriorCounter value (which is the Counter value from the previous running of the tuning code), in step S505, NextCounter is reset to be equal to the Counter value passed from the command interpreter. Later in the code, a decision is made to determine if a sample is completed by utilizing the NextCounter value in part.

In step S506, the Counter value is stored (with an assigned variable called PriorCounter) so that it can be checked against a Counter value that is passed in the next call to the tuning system. In step S507, the duration of a particular I/O processing event being performed by a calling unit (e.g., a command interpreter) is determined using a start time value set by the command interpreter at the beginning of a command's processing, and is added to an accumulator called Tuning.ThisDuration. It is important that the clocking increments be sufficiently small, so that each accumulated duration is measurable.

Note that this method of time keeping (measuring I/O event durations) is inexact, since the measured duration is a wall-time duration of an I/O processing event. For example, in a memory subsystem that performs multitasking, an I/O event A might start processing at a time $t_0$, be temporarily interrupted at a time $t_1$ (by a start of processing of another I/O event B), resume processing at time $t_2$ (after the processing of I/O event B finishes or temporarily stops), and finish its processing at time $t_3$. Thus, the wall time duration of event A is $t_3-t_0$. This value is a crude representation of the duration of event A, since the actual processing time of event A is $(t_1-t_0)+(t_3-t_2)$. Thus, the wall time duration of an I/O event may be larger than the actual processing time of the event due to time slicing.

In step S508, a determination is made as to whether this is the first time through the code for a current sample set. The test is found to be true if a variable SampleCounter is zero. If it is the first time through the code for the current sample set, in step S509 (see FIG. 5B), the sample size and current number of samples in tuning data structures are set with initial data values. If this is also the first use of the tuning system, several configurable parameters of the memory sub-system are reset to reasonable values which are suitable for all command load mixes. In addition, each of the tunable parameters are set to reasonable initial values (regardless of what they were set to in the configuration file), and a delta ($\Delta$), a minimum and a maximum are set for each tunable parameter.

Figure 5A:
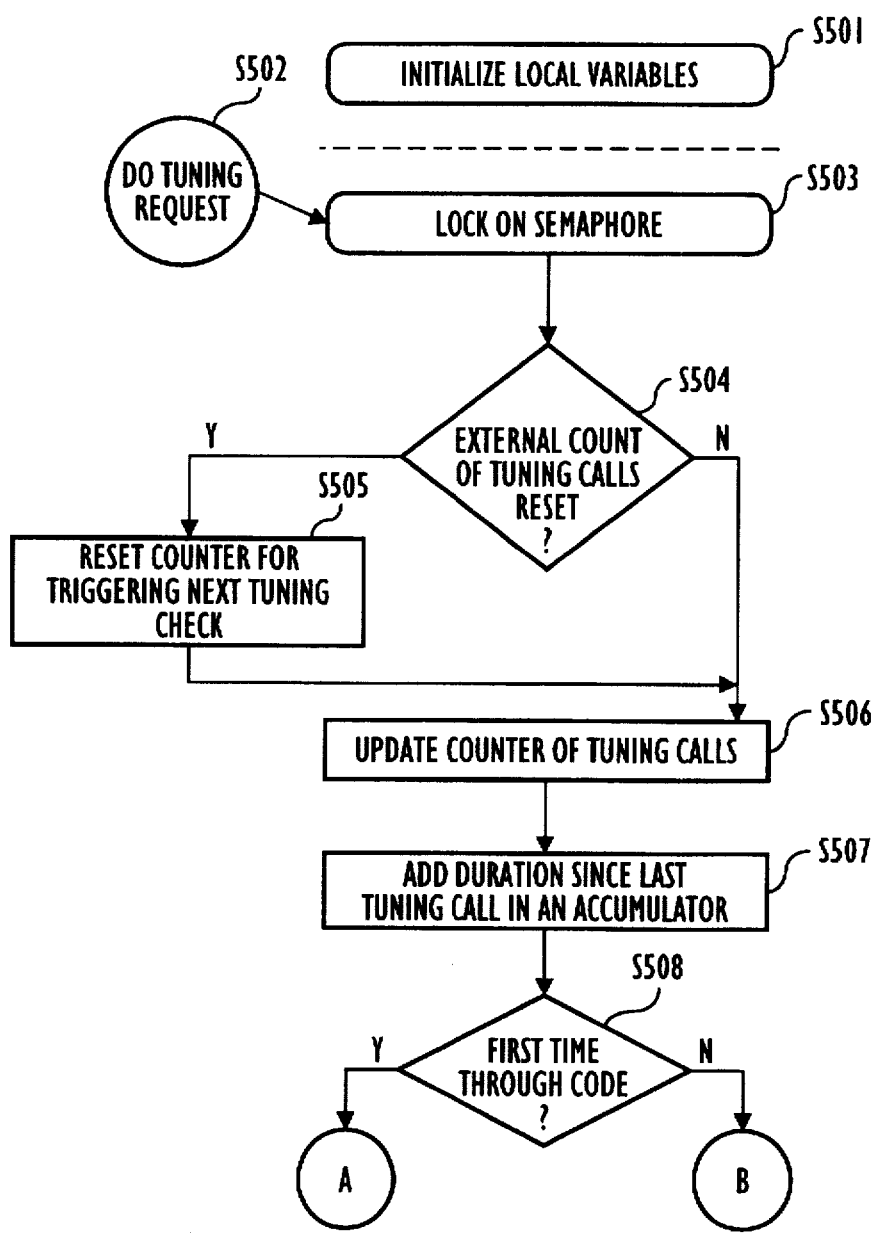
Figure 5B:
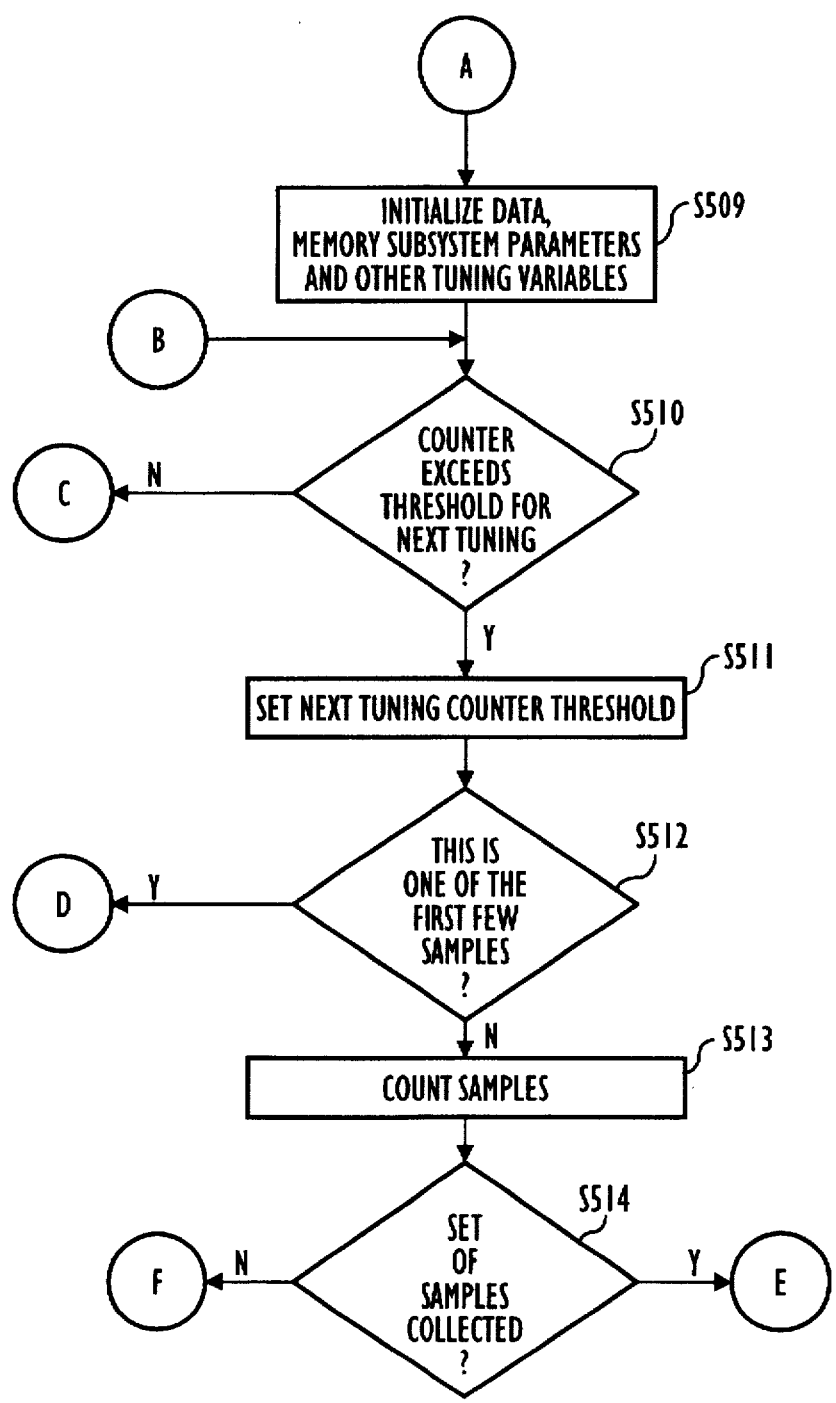
Figure 5C:
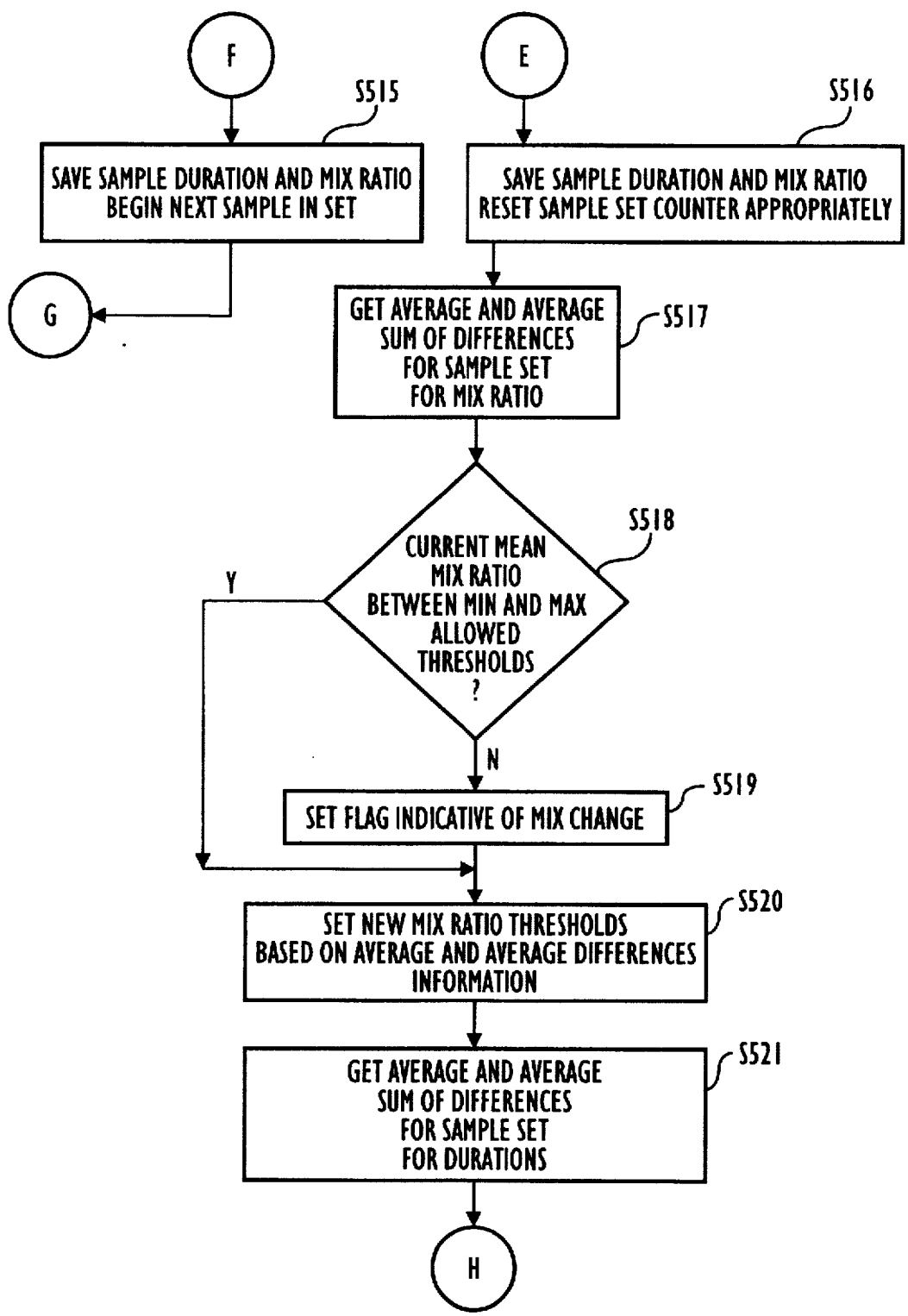
Figure 5D:
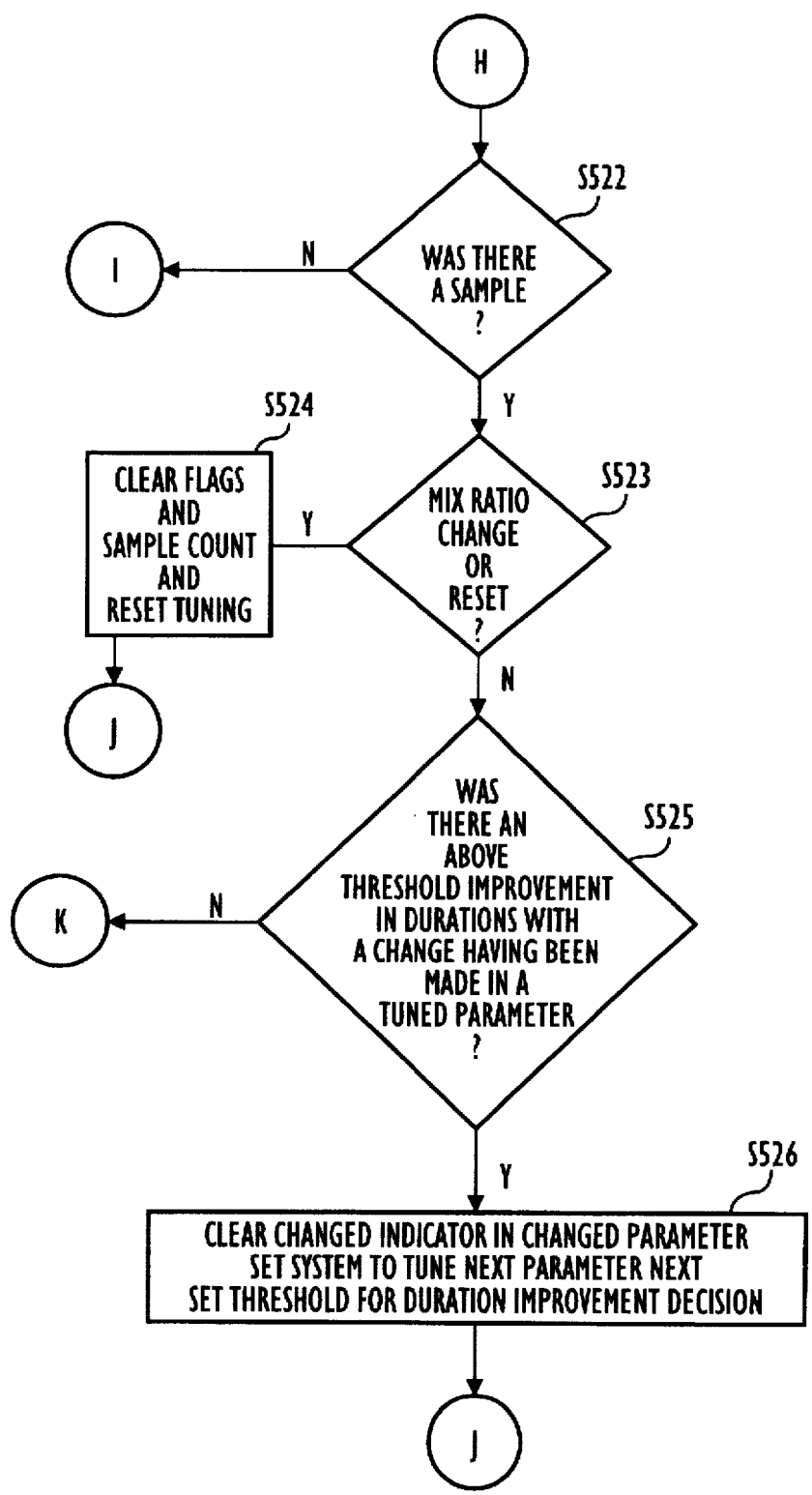
Figure 5E:
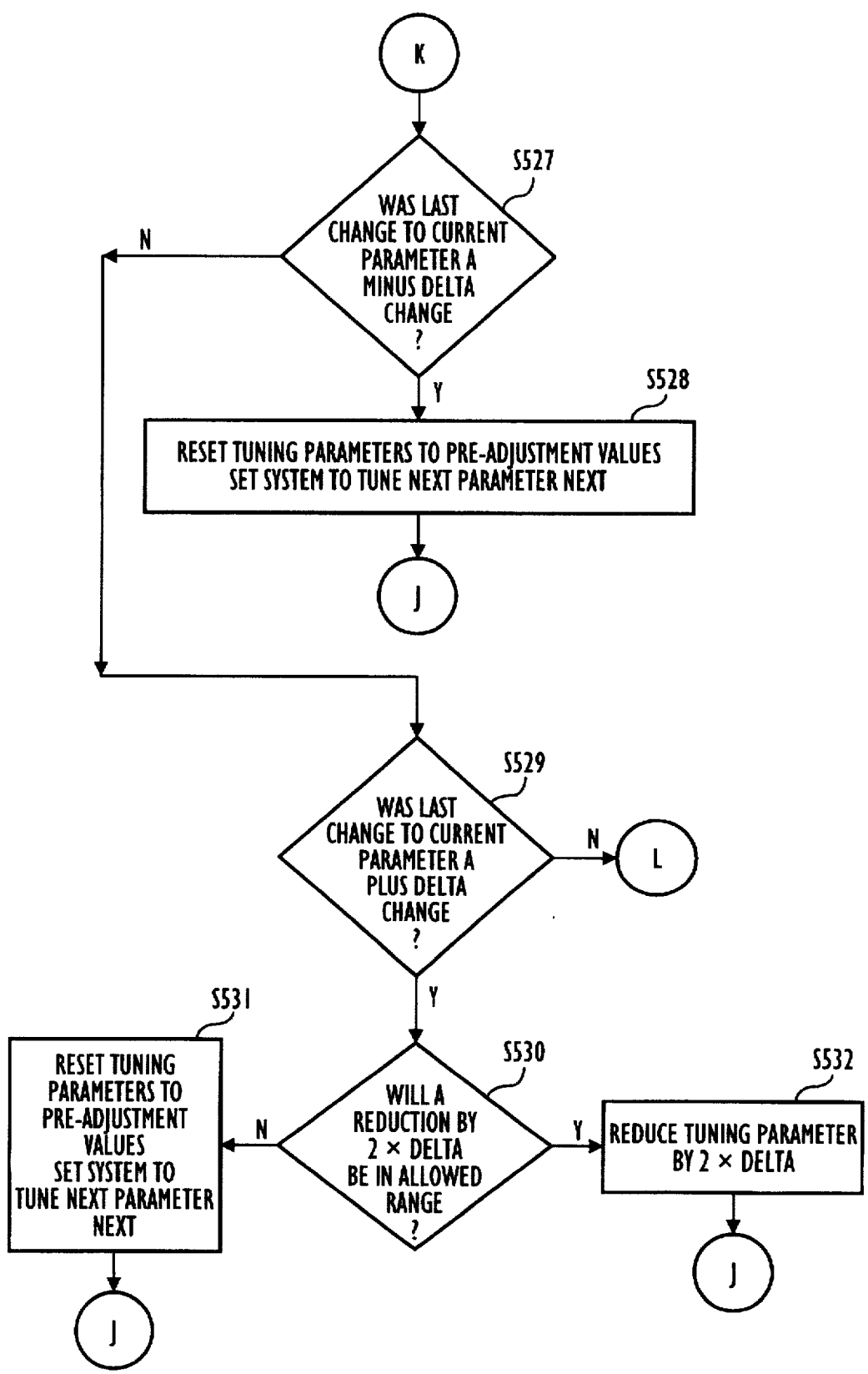

In step S510, a determination is made as to whether or not the current Counter value is greater than an established NextCounter value, i.e., a determination is made as to whether the present sample is complete. If the tuning sample count value (NextCounter) has been surpassed, i.e., the current Counter value is greater than NextCounter, tuning needs to check if a complete set of samples has been collected. It is noted that the counter values which are passed by the memory subsystem may not be contiguous incremental values. In the illustrated embodiment, Counter is not protected by a semaphore, and is only approximate. The count may vary by a value of one or two from the actual count over several thousand incrementations. If the counter has not exceeded the NextCounter threshold, the present sample is not yet complete. Accordingly, the process will proceed directly to step S544 which is illustrated at the bottom of FIG. 5G. However, if Counter does exceed the NextCounter threshold, the present sample is complete and the process proceeds to step S511, where the NextCounter value is set to be equal to its current value incremented by the SampleSize. In code, this is represented by NextCounter+=Tuning.SampleSize. This establishes a next trigger point for indicating completion of the current sample and possibly a set of samples that must be obtained in order to make a tuning decision.

In step S512, a decision is made as to whether or not the present sample is only one of the first few samples being gathered by the tuning code. If it is one of the first few samples, the process will proceed directly to step S543 which is shown towards the bottom of FIG. 5G. However, if the present sample is not one of the first few samples being gathered by the tuning code, the tuning code will proceed to step S513. If the tuning code is at an earlier stage, and thus the present sample is only one of a first few samples, the data that the tuning code presently has is initialization-affected data. Accordingly, such information will seldom be accurate, and thus should not be used to make any tuning decisions. It is noted that this decision step S512 is not absolutely necessary, since any erroneous tuning decisions, made by considering the first initial samples of the tuning code, would have minimal affect and would eventually be corrected by the tuning mechanism. Nonetheless, it is preferred that decision step S512 be included so that such initial erroneous decisions may be avoided.

In step S513, a flag is set to show that a sample has been collected. In particular, a variable SampleCounter is set to 1. Thereafter, in step S514, a determination is made as to whether or not a complete set of samples has been collected. If a complete set of samples has been collected, the process will proceed to step S516 which is indicated at the top right portion of FIG. 5C. However, if a complete set of samples has not yet been collected, the process will proceed to step S515 which is indicated at the top left portion of FIG. 5C. In step S515, the sample's accumulated duration and mix ratio values are saved and the sample counter (Tuning.CurrentNumsamples) is incremented. It is noted that the mix ratio is established outside of the tuning code by a software mechanism which has knowledge of the command information being monitored. In the present case, the mix ratio value is incremented or decremented depending on whether the command received in the command interpreter is even (a read command) or odd (a write command).

In performing step S516, the accumulated duration (Tuning.ThisDuration) and mix ratio (Tuning.ThisMixRatio) values for the present sample are each saved. In addition, the number of current samples is set to zero (Tuning.CurrentNumSamples=0), so that the next time the tuning code is invoked, a new set of samples may be accumulated using this variable.

After step S516, in step S517, some calculations are made of values which will be used to determine whether or not the command mixes of the previous (first) and present (second) sample sets differ. The mean and the mean of the absolute deviations from the mean of the samples in each sample set are determined. These are approximated with integers in order to increase computation efficiency, where appropriate.

As noted above, the mix ratio is set outside the tuning code by a software mechanism which has knowledge of the command information being monitored. In the illustrated embodiment, the mix ratio value is incremented or decremented depending upon whether the command received in the command interpreter is even (i.e., is a read command) or odd (i.e., is a write command). If the command received is even, a 1 is added to the mix ratio accumulator. If the command received is odd, a 1 is subtracted from the mix ratio accumulator. The total accumulated value for a particular sample is equal to the mix ratio for that sample. A plurality of accumulated mix ratio values for respective samples (one per sample) are gathered to form a sample set, which includes in the illustrated embodiment three samples. By way of example, if the present sample set being evaluated includes a mix ratio $x_1$ for sample 1, a mix ratio $x_2$ for sample 2, and a mix ratio $x_3$ for sample 3, the mean $\bar{x}$ will be calculated to be $(x_1+x_2+x_3)/3$, and the mean of the absolute deviations from the mean $x_{\bar{x}}$ of the mix ratios will be calculated to be $(|\bar{x}-x_1|+|\bar{x}-x_2|+|\bar{x}-x_3|)/3$. The calculated mean of the absolute deviations from the mean is an indication of the variability of the mix ratios for the samples in each sample set.

In step S518, a determination is made as to whether or not the mix ratios of the current set are substantially similar to the mix ratios of the previous set. This is statistically estimated by performing a hypothesis test. In performing the hypothesis test, a determination is made as to whether the mean mix ratio of the current sample set $(\bar{x})_{current \ set}$ is between the minimum and maximum allowed thresholds, i.e., it is determined if the following relationship is true:

$$(\bar{x}-nx_{\bar{x}})_{previous \ set} \leq (\bar{x})_{current \ set} \leq (\bar{x}+mx_{\bar{x}})_{previous \ set}; m=n=2.$$

The thresholds are initially set to zero outside of the tuning code in order to prevent a "yes" determination in step S518 on the first pass (where there is no previous set). If the current mean mix ratio $(\bar{x})_{current \ set}$ between the minimum and maximum allowed thresholds, the process proceeds to step S519, where a flag is set which indicates that a mix change has occurred. If, however, the current mean mix ratio, $(\bar{x})_{current \ set}$ between the minimum and maximum allowed thresholds, a mix change has not occurred, and the process will proceed directly to step S520.

In step S520, minimum and maximum thresholds are established for a next I/O event comparison (to be performed in step S518 during the next run of the tuning code for the next sample set), based upon the current set of samples and the mix ratio characteristics thereof.

The calculated mean $\bar{x}$ and mean of the absolute deviations from the mean (differences from the mean) $x_{\bar{x}}$ of the samples of the current (first) sample set are used to calculate a max value and a min value for the mean mix ratio of a subsequent (second) sample set. The min and max thresholds are determined as follows:

$$(\bar{x}_{max})_{second \ set}=(\bar{x}+mx_{\bar{x}})_{first \ set}; \text{ and}$$

$$(\bar{x}_{min})_{second \ set}=(\bar{x}-nx_{\bar{x}})_{first \ set}; m=n=2.$$

In step S521, the mean $\bar{x}$ and mean of the absolute deviations from the mean $x_{\bar{x}}$ of accumulated duration values in the sample set are calculated. Again, the overhead is minimized by using integer math as appropriate in order to perform calculations. The process will then proceed to step S522 which is shown at top of FIG. 5D. In step S522, the process will test if a sample exists at the present point in the tuning code. In the illustrated embodiment, there will always be an indication that there is a sample. Thereafter, in step S523, a determination is made as to whether or not there was a mix ratio change, by checking a flag which indicates that the mix ratio changed between sample sets (which would have been set in step S519), and further checks if a reset desired flag has been set. Step S524 is then performed, if the mix ratios have changed or if the reset desired flag has been set. In step S524, the value of the ratio changed flag is reset, and the current sample count is reset, so that the tuning code will start collecting a new set of samples when it is invoked the next time. In addition, a MinDecideDuration variable is set to zero so that it will later be recalculated based upon a next sample set collected by the tuning code. In addition, in step S524, the system is reset to revert changes made to the last modified parameter and its derivatives, and to reset the system to start tuning with the first of the memory subsystem's tunable parameters.

If there was no significant change in the mix ratios and the reset desired flag has not been set, as determined in step S523, the process will proceed to step S525 where a determination is made as to whether there was a change made to a parameter, and if there was, whether an estimation of the system I/O performance has improved due to the parameter change. The relative system I/O performance is estimated by performing a hypothesis test to thereby determine if there was an overall decrease in the lengths of I/O processing event durations being measured after the parameter was changed. More specifically, in step S525, if there was a change made to a tunable parameter, a hypothesis test is performed to determine if the mean $\bar{x}$ of accumulated duration values for the present (second) sample set (with the parameter changed) is less than a duration threshold value (determined based upon a previous (first) sample set). The hypothesis test includes a determination as to whether the following relationship is true:

$$(\bar{x})_{second\ set} \leq (\text{larger of } 0 \text{ and } \bar{x} - nx_{\bar{x}})_{first\ set}; n=1.$$

If a sample set includes an accumulated duration value a for sample 1, an accumulated duration value b for sample 2, and an accumulated duration value c for sample 3, the mean $\bar{x}$ of the accumulated duration values is $x=(a+b+c)/3$, and the mean of absolute deviations from the mean is:

$$x_{\bar{x}} = (|\bar{x}-a|+|\bar{x}-b|+|\bar{x}-c|)/3.$$

The duration threshold value with which the mean $\bar{x}$ of a current (second) sample set is compared is determined as a function of the mean $\bar{x}$ and mean of absolute deviations from the mean $x_{\bar{x}}$ of the accumulated duration values of a previous (first) sample set. Each of the determining steps S518 and S525 includes a hypothesis test which utilizes information regarding the mean $\bar{x}$ of a sample set and the variability of the samples in the set, represented by the mean of absolute deviations from the mean $x_{\bar{x}}$. The types of hypothesis tests described herein are not the only types of statistical tests that can be performed to obtain desired results. Other statistical methods could be used, such as, e.g., a Z test. More information about hypothesis testing and other statistical methods is provided by Jay L. Devore in "Probability of Statistics for Engineering and the Sciences", Brooks/Cole Publishing Co., Monterey, Calif. (1982), the content of which is expressly incorporated by reference herein in its entirety.

If, in step S525, a determination is made that there was an improvement in the estimated system I/O performance due to a change being made to a tuned parameter, the process will proceed to step S526. However, if there was no estimated improvement, or if there was no change made in a tuned parameter, the process will be proceed (via connector K) to step S527 which is illustrated at the top of FIG. 5E. In step S526, if desired, the tuning system may display and/or log an indication that a decision was made to change a configurable parameter. Such a display and/or logging may be configured with the use of a configuration tag setting, e.g., provided in a configuration file of the memory sub-system. In any event, in step S526, the tuning system will modify an indication that the present tuned parameter was modified, so that the next time through the tuning code, it will again go through the modification process. In addition, at this step, the tuning code will be set to modify a next parameter, monitor the results thereof, and tune the parameter accordingly. The next parameter to be tuned may either be the next in a given list, or the first in the list, in case the last in the list was the tunable parameter that was just evaluated.

In addition, the duration threshold value will be calculated in step S526 based upon the current (first) sample set to be used as the basis for the threshold improvement decision for the next (second) sample set (in step S525). The duration threshold value for the next (second) sample set is calculated as the larger of 0 and $(\bar{x}-x_{\bar{x}})_{first\ set}$. If the tuning code is set to again modify the first parameter, the ResetDesired flag will not be set so that the tuning mechanism will not recalculate the duration threshold value which will be used to make an improvement decision.

Figure 5F:
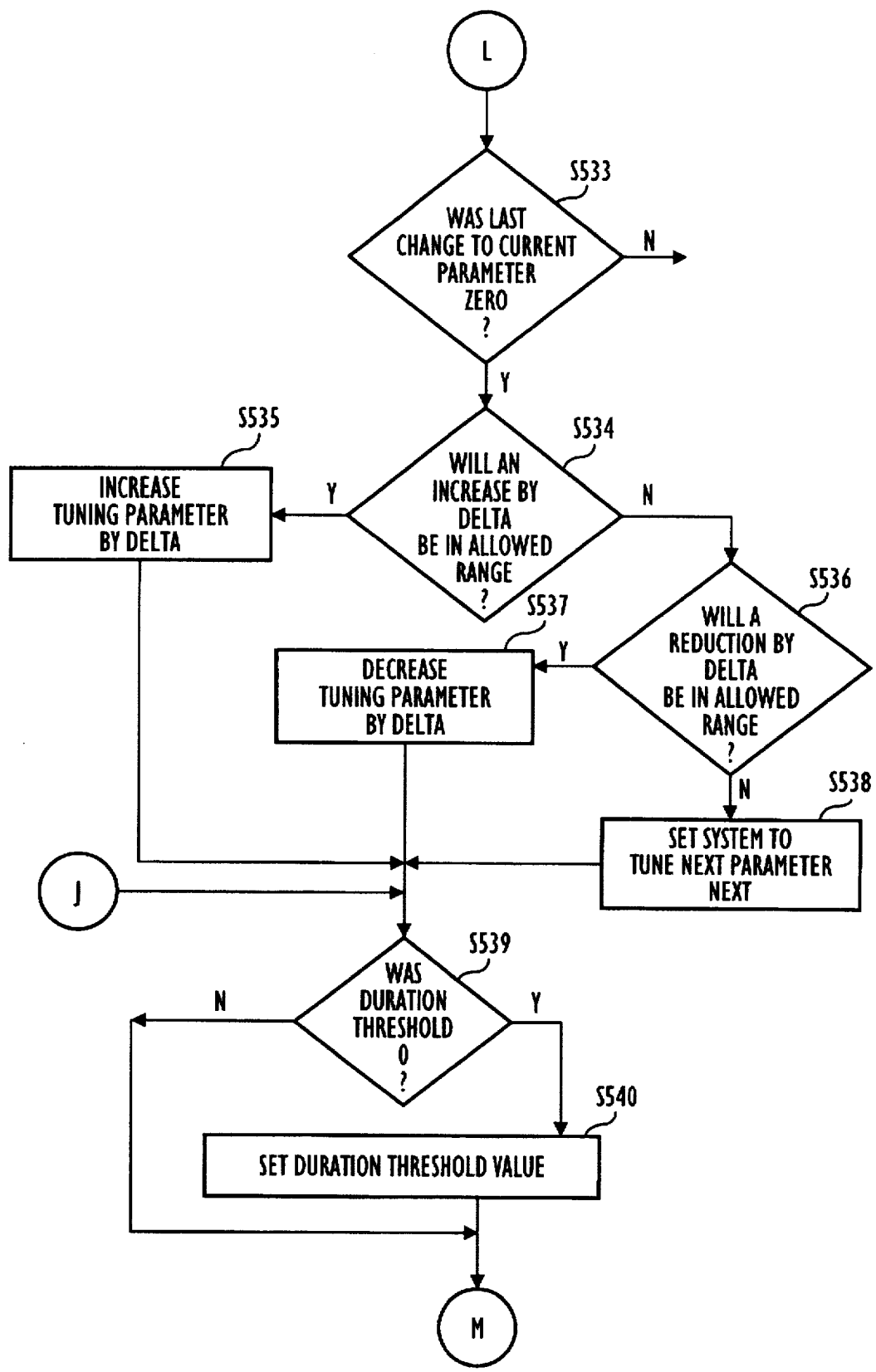
Figure 5G:
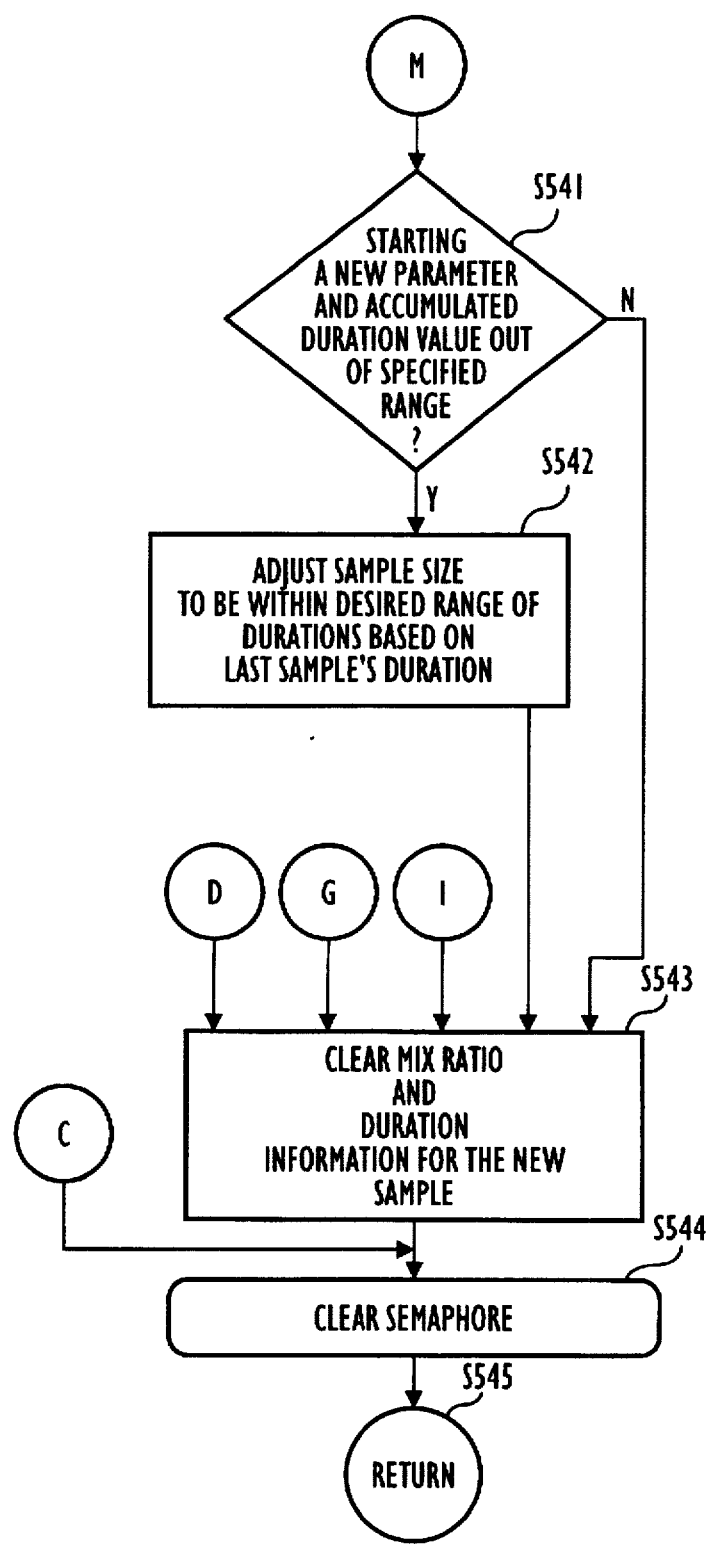

After execution of step S526, the tuning process will proceed (via connector J) to step S539 which is shown in a lower portion of FIG. 5F.

Proceeding from step S525, assuming that it was decided that there was not an estimated improvement in system performance, or that the tuned parameter was not changed before the present sample, step S527 will then be executed which is shown at the top of FIG. 5E. In step S527, a determination is made as to whether the last change to the current parameter was a $-\Delta$ change. If the last change was not a $-\Delta$ change, the process will proceed to step S529. However, if a change was made to the current parameter, and it was a $-\Delta$ change, the process will proceed to step S528, where the tuning parameters will be reset to pre-adjustment values, and the system will be set to tune the next tunable parameter in a next run of the tuning process. The process then directly proceeds (via connector J), to step S539 which is shown at the lower portion of FIG. 5F (via connector J).

In step S529, a determination is made as to whether the last change to the current parameter was a $+\Delta$ change. If not, the process will proceed (via connector L) to step S533 which is shown at the top of FIG. 5F. If the last change was a $+\Delta$ change, the process will proceed to step S530, where a test is made as to whether or not a reduction by $2\Delta$ of the parameter would result in a parameter being within an allowed range. If such a reduction in the parameter would still result in the parameter being in an allowed range, the process will proceed to step S532, where the tuning parameter will be reduced by $2\times\Delta$. If reducing the parameter by $2\Delta$ would take the parameter out of an allowed range, the process will proceed to step S531, wherein the tuning parameters will be reset to preadjustment values, and the system will be set to tune a next tunable parameter. After performing either of steps S531 or S532, the process proceeds directly to step S539 (via illustrated connector J).

If it was determined in step S539 that the last change to the current parameter was not a +Δ change, the process proceeds to step S533 which is shown at the top of FIG. 5F, where a determination is made as to whether the last change to the current parameter was zero. If true, this signifies that the present parameter has not been changed by the tuning system. Accordingly, the process proceeds to step S534, where a test is made as to whether or not an increase in the parameter by Δ would result in a parameter being still within an allowed range. If increasing the parameter by Δ would keep the parameter within an allowed range, the process will proceed to step S535, where the tuning parameter will be accordingly increased. If, however, the increase would take the parameter out of the allowed range, the process will proceed to step S536, where a further test is performed to determine if a reduction in the parameter by Δ would keep the parameter within an allowed range. If such a reduction would keep the parameter within an allowed range, the process proceeds to step S537, where the parameter is accordingly decreased by Δ. However, if reducing the parameter by Δ takes the parameter out of the allowed range, the process will proceed from step S536 directly to step S538, where the system is set to tune a next parameter in the next run of the tuning code. After increasing the tuning parameter in step S535, deceasing the parameter by Δ in step S537, or setting the system to tune the next parameter in the next tuning run in step S538, the process will proceed to step S539, where a decision is made as to whether or not a duration threshold value has already been calculated. If the duration threshold has not already been calculated, it will be zero, and the process will proceed to step S540, where the duration threshold value will be calculated (as the larger of 0 and $(\bar{x}-x_{\bar{z}})$). If the duration threshold has already been calculated, the process will skip S540, and will proceed (via connector M) directly to step S541, which is illustrated at the top of FIG. 5G. In step S541, a test is performed to see if the tuning process is to be performed on a new parameter, and if the mean accumulated duration value $\bar{x}$ for the samples of the present sample set is outside of a pre-specified range. If the system is not starting a new parameter, or if $\bar{x}$ is within the prespecified range, the process will proceed directly to step S543, where the mix ratio and duration accumulators are cleared for a new sample that will now be obtained and evaluated by the tuning system. In the alternative, if a new parameter tuning process is to be started and the mean accumulated duration value $\bar{x}$ for the sample set is outside of the specified range, the process will proceed from step S541 to step S542. In step S542, the sample size will be adjusted to a value that ensures that the samples will be large enough (i.e., have a large enough number of measured I/O processing events) to get valid data indicative of system performance, but not too large (not too many events) so that the amount of time it takes to measure and accumulate duration values of all of the events of the sample will not be excessive. Accordingly, a new sample size will be established in step S542 if needed.

In step S543, as noted above, the mix ratio and duration accumulators are cleared out so that they can be used to accumulate information for the new upcoming sample. In step S544, the semaphore lock for the tuning code is cleared, so that another tuning activity can take place, when the tuning code is called by an event taking place in the memory subsystem code outside of the tuning system. In step S545, the tuning code will return to the memory sub-system software.

The following additional explanation is given regarding step S509, which corresponds to lines 30–99 in Appendix B which is appended to the present patent document. The relevant tuning data structures are described in Appendix A. The main structure is shown at lines 21–38 of Appendix A, with a substructure described at lines 12–19. Line 2 of Appendix B indicates that Tuning is the name of a TuningStruct type of structure. In Appendix B, at line 34, the CurrentNumSamples is set to zero, since no usable samples have currently been taken. At line 35, the initial sample size is set to 1000. This means that a sample will comprise the data collected through 1000 calls to the tuning code, which, in the illustrated embodiment, means that 1000 channel commands will be processed by the body of command interpreters in the memory subsystem. It should be noted that it is not necessary that the durations of 1000 channel commands be sampled for each sample, nor is it absolutely necessary that the complete duration of a given I/O command processing by the memory subsystem be timed. For example, only part of the I/O command processing could be timed. In addition, it is not necessary that the tuning code be called for every channel command being processed by the memory subsystem. For example, the tuning code may be configured to be called every nth command that is issued to the memory subsystem. Lines 38–39 are only traversed once. The logical test in line 37 is switched by the assignment made in line 39. At lines 40–41, the address of the Cache_Read_Ahead_Track_Count configuration tag is set into a Tuning.Settings entry so that its value can be directly modified by the tuning code.

The code in Appendix A begins with the establishment of names for constants. NumTuningParms defines how many parameters will be tuned through this system. The Tuning structure entry (subscript) numbers for the tuning parameters are identified in lines 5–7 of the code in Appendix A.

At lines 42–43 of the code in Appendix B, the content of the Cache_Read_Ahead_Track_Count variable is set to a reasonable initial value, regardless of what it was initially configured as in the configuration file. At line 44, the LastChange indicator in the Tuning structure is set for the Cache_Read_Ahead_Track_Count tuning structure entry. As this is an initialization process, there has been no dynamic tuning made to this variable; thus, it is initially set to zero. At line 45, the delta value to apply to the Cache_Read_Ahead_Track_Count value when attempting to change it is set. It is important that the delta be large enough to effect performance when added to or subtracted from the initial parameter value. At line 46, the minimum allowed value for the Cache_Read_Ahead_Track_Count is set. At line 47, the maximum allowed value for the Cache_Read_Ahead_Track_Count is set.

At lines 49–55, the same process is performed for the second dynamically tuned cache parameter: Cache_Read_Preserve_Percent. At lines 57–63, the same process is performed for the third dynamically tuned cache parameter: Cache_PreRead_Preserve_Percent.

At lines 66–80, values are set for the one-time changing of configuration parameters of the memory subsystem with known affects. The tuning code sets those parameters to reasonable values which are suitable for all command load mixes. This feature is provided for by the tuning mechanism in order to allow the tuning mechanism to over-ride poorly set (i.e., poorly or erroneously chosen) configuration file entries.

At lines 82–96, calculated configuration parameters are set which may have been affected by the parameter changes which were just made. These are configuration parameters which are derived from other parameters; they are not directly identified in the configuration file, and thus must be calculated based upon other specified parameter values.

H. Automatic Tuning of Drain-on-Read and Drain-on-Write Parameters

As described above, in relation to FIG. 4A, the memory sub-system illustrated in FIG. 1 may be provided with a mechanism for performing drain-on-reads and/or drain-on-writes. The illustrated memory subsystem may be configured so that one or both of these drain mechanisms are activated, to drain updated buffers that are not being used and will not be needed, from the cache to the peripheral disks connected to the memory sub-system. Referring To FIG. 4A, an automatic drain tuning mechanism may be provided in the memory subsystem for automatically switching ON or OFF each of switches 35A and 35B, to thereby control whether or not drain-on-read module 30 and drain-on-write module 32 are each activated. The memory subsystem may be user-configured to have cache tuning ON or OFF by setting a Cache_Tuning configuration parameter. For example, by setting Cache_Tuning to 1 or higher, this cache tuning may be switched ON. Thus, with the illustrated embodiment, the automatic drain tuning mechanism is operable when Cache_Tuning is set to 1 or higher.

Switching of a drain-on-write module, effected by switch 35B shown in FIG. 4A, may be controlled by the steps shown in FIG. 9 in connection with a forced physical write process of a cache I/O system, as illustrated in FIG. 9. Before executing a forced physical write, in accordance with the embodiment illustrated in FIG. 9, at step S134 the routine will wait until the appropriate I/O thread is available. After the I/O thread becomes available, in step S136, an I/O packet will be set up for the target disk thread, and the count of updated records will be decremented. Thereafter, in step S138, the I/O initialized indication flag will be set, and in step S140, the I/O request semaphore will be cleared, thus causing the appropriate I/O thread to execute. An example I/O thread routine is illustrated in FIG. 9 of parent application Ser. No. 08/053,655.

After the performance of step S140, a determination may be made at step S142 as to whether or not the cache tuning was set. If cache tuning has been set, the process will proceed to step S144 where a determination will be made as to whether the current cache updated record count (i.e., the number of updated records currently in cache) exceeds one half of a drain on the threshold value. If it is determined in step S144 that the updated record count exceeds one half of the drain on the threshold value, the process proceeds to step S146, where a cache drain-on-read will be executed. However, if the current cache updated record count does not exceed one half of the drain on the threshold value, the process will bypass the cache drain-on-read step S146. If cache tuning is not set, as determined in step S142, the process will proceed directly from step S142 to step S148, where a further determination is made as to whether the user has configured the system to perform the cache drain-on-write in conjunction with forced physical writes. If the user has configured the system to perform a cache drain-on-write, the process will proceed from step S148 to step S146, where the cache drain-on-write will be executed. Otherwise, the process will proceed from step S148 and will bypass the cache drain-on-write step S146. As noted above, the memory subsystem may be set to perform cache tuning (including either or both of the automatic drain tuning and the continuous incremental parameter tuning mechanisms) by setting a parameter called Cache_Tuning in the configuration file to an integer value of 1 or higher.

In a similar manner, switching of a cache drain-on-read module, effected by switch 35A shown in FIG. 4A, may be controlled by the steps shown in FIG. 10 in connection with a read process of the cache I/O system. As shown in FIG. 10, in an initial step S154, the processing will proceed when an I/O thread is available. Thereafter, in step S156, an I/O packet will be set up for the target disk thread. Once the I/O packet is set up, in step S158, the I/O initialized indication flag will be set. Thereafter, the appropriate I/O request semaphore will be cleared in step S160, and pre-read processing will be executed in step S162. After performing step S162, a determination will be made at step S164 as to whether or not the cache tuning has been set. If the cache tuning has been set, the process will proceed to step S166, at which point the process will determine if a cache drain-on-read should be performed. In step S166, a determination is made as to whether or not the current cache updated record count exceeds a drain-on-read threshold. If the current cache updated record count exceeds the drain-on-read threshold, the process will proceed directly to step S168, where a cache drain-on-read will be executed. However, if the current cache updated record count does not exceed the drain-on-read threshold, the process will bypass the cache drain-on-read step S168.

If the cache tuning was not set, as determined at step S164, the process will go to step S170, where a determination will be made as to whether or not the user has configured the system to perform a cache drain-on-read when performing a physical read of data. If the user has configured the system to perform a cache drain-on-read when preforming physical reads, the process will proceed directly to step S168, where a cache drain-on-read will be executed. On the other hand, if the user has configured the system to not perform a cache drain-on-read, the process will go from step S170 and bypass the cache drain-on-read step S168.

In determining if a drain-on-read or a drain-on-write operation should be performed in connection with a physical write or a physical read as shown in each of FIGS. 9 and 10, respectively, a value called the drain-on-read threshold is utilized. A suitable drain-on-read threshold may be obtained using empirical data that represents the system performance, e.g., by trying different threshold values in a particular system situation, and by analyzing the resulting performance based upon the tried values. In the illustrated embodiment, the drain-on-read threshold is calculated as (Cache_Num_Buffers/100) * Cache_Read_Preserve_Percent/2. It is noted that Cache_Num_Buffers and Cache_Read_Preserve_Percent are configurable parameters, which respectively represent the number of buffers in the storage controller's RAM which will be dedicated for caching and the percent of buffers to be preserved by the cache for reading, respectively. These parameters may also be automatically tuned, resulting in modification to the threshold values derived therefrom.

While the invention has been described with reference to preferred embodiments, it is understood that the words which have been used herein are words of description, rather than words of limitation. Changes may be made, within the purview of the appended claims, without departing from the scope and spirit of the invention in its aspects. Although the invention has been described herein in reference to particular means, materials and embodiments, it is understood that the invention is not to be limited to the particulars disclosed herein, and that the invention extends to all equivalent structures, methods and uses, such as are within the scope of the appended claims.

APPENDIX A

```
1   /*TUNEDEFS.H*/
2
3   #define NumTuningParms  3       /* Number of values to be dynamically tuned */
4
5   #define CRATCParm       0       /* CacheReadAheadTrackCount parm subscript */
6   #define CRPPParm        1       /* CacheReadPreservePercent parm subscript */
7   #define CPRPPParm       2       /* CachePreReadPreservePercent parm subscript */
8
9
10  #define NumSamples      4       /* Number of intervals to hang on to */
11
12  struct TuneSetStruct
13  {
14      UINT    *Value;             /* value in the parameter */
15      INT     LastChange;         /* what was last done to the parm */
16      UINT    ChangeDelta;        /* how much to change it by */
17      UINT    MinValue;           /* minimum value this can be */
18      UINT    MaxValue;           /* maximum value this can be */
19  };
20
21  struct TuningStruct
22  {
23      struct  TuneSetStruct
24              Settings[NumTuningParms]; /* hold info for each parm */
25      ULONG   Durations[NumSamples];  /* timings with this setting */
26      UINT    CurrentNumSamples;      /* number of samples being held */
27      UINT    ThisDuration;           /* accumulator */
28      INT     ThisMixRatio;
29      INT     MixRatios[NumSamples];  /* +1 per read, -1 per write */
30      UINT    SampleSize;             /* number of cmds in sample */
31      UINT    CurrentParmNumber;      /* which parm being worked on */
32      ULONG   StartTime[MaxNumMFDisksConfig]; /* hold accumulations */
33      ULONGLock;
34      UINT    MinDecideDuration;
35      INT     MaxDecideRatio;
```

APPENDIX A

```
36      INT     MinDecideRatio;
37      UINT    TuneSampleSize;
38      );

/* TUNE.H */
struct TuningStruct Tuning;  /* all is in here */
char * TuneNames[NumTuningParms]=
        ("Cache_Read_Ahead_Track_Count",
         "Cache_Read_Preserve_Percent",
         "Cache_PreRead_Preserve_Percent");
```

Page 2
© Southwestern Bell Technology Resources, Inc. 1992-1994

APPENDIX B

```
1   void DoTuning(UINT IDNumber,ULONG Counter)/*-183-*/
2   {
3   #include "ccwstrct.ext"
4   #include "tunedefs.h"
5   #include "tune.ext"
6   ULONG Now,Then;
7   UCHAR  LocalBuffer[80];
8   static ULONG NextCounter=0;
9   #define INCL_DOSFILEMGR
10  static UINT SampleCounter=0;
11  static ULONG PriorCounter=0;
12  static UINT PriorSampleSize=0;/*-190-*/
13  static UINT FirstTimeThrough=1;/*-336-*/
14  static UINT ResetDesired=0;/*-336-*/
15  DosRequestMutexSem(Tuning.Lock,SEM_INDEFINITE_WAIT);
16
17  if(Counter < PriorCounter)
18     NextCounter=Counter; /* Counter was reset, so should I -186-*/
19  PriorCounter=Counter;
20
21
22
23  Then=Tuning.StartTime[IDNumber];
24  if(Then != 0) /* use it */
25  {
26     DosQuerySysInfo((ULONG)14,(ULONG)14,&Now,(ULONG)4);
27
28     Tuning.ThisDuration+=Now-Then;
29
30  }
31  if(SampleCounter==0)
32  {
33     /* Set Inital Values Here for Cache Parameters */
34     Tuning.CurrentNumSamples=0;
35     Tuning.SampleSize=1000;
```

© Southwestern Bell Technology Resources, Inc. 1992-1994

APPENDIX B

```
36   if(FirstTimeThrough)/*-336-*/
37   {
38   FirstTimeThrough=0;/*-336-*/
39   Tuning.Settings[CRATCParm].Value=
40       &Config.File.Cache_Read_Ahead_Track_Count;
41   *Tuning.Settings[CRATCParm].Value=min(2,
42       Config.File.SCSI_Mesh_Factor);/*-190-*//*-268-*/
43   Tuning.Settings[CRATCParm].LastChange=0;
44   Tuning.Settings[CRATCParm].ChangeDelta=1;/*-268-*/
45   Tuning.Settings[CRATCParm].MinValue=0;
46   Tuning.Settings[CRATCParm].MaxValue=min(MaxReadAhead,6);/*-268-*/
47
48   Tuning.Settings[CRPPParm].Value=
49       &Config.File.Cache_Read_Preserve_Percent;
50   *Tuning.Settings[CRPPParm].Value=10;/*-262-*/
51   Tuning.Settings[CRPPParm].LastChange=0;
52   Tuning.Settings[CRPPParm].ChangeDelta=10;/*5-262-*//*-285-*/
53   Tuning.Settings[CRPPParm].MinValue=0;
54   Tuning.Settings[CRPPParm].MaxValue=50;/*20-262-*//*-285-*/
55
56   Tuning.Settings[CPRPParm].Value=
57       &Config.File.Cache_PreRead_Preserve_Percent;
58   *Tuning.Settings[CPRPParm].Value=10;/*-262-*/
59   Tuning.Settings[CPRPParm].LastChange=0;
60   Tuning.Settings[CPRPParm].ChangeDelta=10;/*5-262-*//*-285-*/
61   Tuning.Settings[CPRPParm].MinValue=0;
62   Tuning.Settings[CPRPParm].MaxValue=50;/*20-262-*//*-285-*/
63
64   if(Config.File.Counter_Display_Mod_Default < 1000 ||
65       CounterDisplayModValue < 1000)/*-187-*/
66   {
67       Config.File.Counter_Display_Mod_Default=10000;
68       CounterDisplayModValue=10000;
69   }
```

© Southwestern Bell Technology Resources, Inc. 1992-1994

APPENDIX B

```
72      if(Config.File.Cache_Display_Stats_Mod < 500)
73          Config.File.Cache_Display_Stats_Mod=1000;
74      if(Config.File.Cache_Max_Dynamic_Sleep_Sec < 4)
75          Config.File.Cache_Max_Dynamic_Sleep_Sec=4;
76      Config.File.Cache_Max_To_One_Over=2;
77      if(Config.File.Cache_Min_Dynamic_Sleep_Time < 1000)
78          Config.File.Cache_Min_Dynamic_Sleep_Time=1000;
79      if(Config.File.Cache_Min_Dynamic_Sleep_Thresh < 1000)
80          Config.File.Cache_Min_Dynamic_Sleep_Thresh=1000;
81
82      Config.Calc.ReadSearch =
83          (UINT)(
84              (float)Config.File.Cache_Num_Buffers  / 100. *
85              (float)Config.File.Cache_Read_Preserve_Percent
86          );
87
88      Config.Calc.PreReadSearch =
89          (UINT)(
90              (float)Config.File.Cache_Num_Buffers  / 100. *
91              (float)Config.File.Cache_PreRead_Preserve_Percent
92          );
93
94      Config.Calc.DrainOnReadThreshold=
95          Config.Calc.ReadSearch/2;/*-171-*/
96
97
98
99
100 }
101 if(Counter > NextCounter)
102 {
103     NextCounter1=Tuning.SampleSize;
104
105     if(Counter > Tuning.SampleSize * 3) /* ignore first few due to loading */
106     {
107         INT     Average;
```

Page 3

© Southwestern Bell Technology Resources, Inc. 1992-1994

APPENDIX B

```
108           INT     AverageSumOfDiffs;
109           UINT    i;
110           CHAR    String[80];
111
112       SampleCounter=1;/*-186-*/
113       if(Tuning.CurrentNumSamples < NumSamples-1)
114       {
115       /* just accumulate data, cannot decide anything yet */
116       Tuning.MixRatios[Tuning.CurrentNumSamples]=Tuning.ThisMixRatio;/*-336-*/
117       Tuning.Durations[Tuning.CurrentNumSamples++]=Tuning.ThisDuration;
118       }
119       else /* have N samples, check this out */
120       {
121       Tuning.Durations[Tuning.CurrentNumSamples]=Tuning.ThisDuration;
122       Tuning.MixRatios[Tuning.CurrentNumSamples]=Tuning.ThisMixRatio;
123       Tuning.CurrentNumSamples=0;/* next starts new sample set */
124       /* save variability information */
125
126       /* for ratios */
127       Average=0;
128       for(i=0;i<NumSamples;i++)
129           Average+=
130               Tuning.MixRatios[i]/NumSamples;/* approximated integer */
131       Average+=(NumSamples/2)*NumSamples;
132       AverageSumOfDiffs=0;
133       for(i=0;i<NumSamples;i++)
134           AverageSumOfDiffs+=
135               abs(Tuning.MixRatios[i]-Average)/NumSamples;
136
137       if(SampleCounter > 0)
138       /* this is not the first go around */
139           if(Average > Tuning.MaxDecideRatio ||
140              Average < Tuning.MinDecideRatio)
141           {
142               Tuning.CurrentParmNumber=0;/* new mix detected, start over */
143               Tuning.CurrentNumSamples=NumSamples+10;/*flag*/
```

Page 4

© Southwestern Bell Technology Resources, Inc. 1992-1994

APPENDIX B

```
144              }
145              /* ALWAYS set next decision point */
146              Tuning.MinDecideRatio=Average-
147                    (AverageSumOfDiffs*2);
148              Tuning.MaxDecideRatio=Average+
149                    (AverageSumOfDiffs*2);
150         }
151
152         /* for durations */
153         Average=0;
154         for(i=0;i<NumSamples;i++)
155              Average+=
156                    Tuning.Durations[i]/NumSamples;/* approximated integer */
157         Average+=(NumSamples/2)*NumSamples;
158         AverageSumOfDiffs=0;
159         for(i=0;i<NumSamples;i++)
160              AverageSumOfDiffs+=
161                    abs(Tuning.Durations[i]-Average)/NumSamples;
162         if(SampleCounter > 0)
163         /* this is not the first go around */
164         if(Tuning.CurrentNumSamples==NumSamples+10 || ResetDesired)
165         {
166              ResetDesired=0;/*-336- done */
167              Tuning.MinDecideDuration=0;/*-336- reset it */
168              Tuning.CurrentNumSamples=0;/* ratio changed, re-collect*/
169
170              /* revert parm changes and start fresh -336-*/
171
172              *Tuning.Settings[Tuning.CurrentParmNumber].Value-=
173                    Tuning.Settings[Tuning.CurrentParmNumber].LastChange;
174              Tuning.Settings[Tuning.CurrentParmNumber].LastChange=0;
175              Tuning.CurrentParmNumber=0;
176         }
177
178    Config.Calc.ReadSearch =
179         (UINT)(
```

© Southwestern Bell Technology Resources, Inc. 1992-1994

Page 5

APPENDIX B

```
180              (float)Config.File.Cache_Num_Buffers    / 100. *
181              (float)Config.File.Cache_Read_Preserve_Percent
182                  );
183
184     Config.Calc.PreReadSearch =
185         (UINT)(
186              (float)Config.File.Cache_Num_Buffers    / 100. *
187              (float)Config.File.Cache_PreRead_Preserve_Percent
188                  );
189
190     Config.Calc.DrainOnReadThreshold=
191              Config.Calc.ReadSearch/2;/*-171-*/
192
193     }
194     else if(Average < Tuning.MinDecideDuration
195         && Tuning.Settings[Tuning.CurrentParmNumber].
196              LastChange !=0)
197     {
198
199     if(Config.File.Cache_Tuning > 2)/*-336-*/
200     {
201         sprintf(String,"Tuned: %s to %d.",
202              TuneNames[Tuning.CurrentParmNumber],
203              *Tuning.Settings[Tuning.CurrentParmNumber].Value);
204         TDWindow(String,MiscWindow);
205     }
206     if(Config.File.Cache_Tuning > 3)/*-336-*/
207     {
208         TempHandle=LogStart();
209         fprintf(TempHandle,"Tuned: %s to %d.",
210              TuneNames[Tuning.CurrentParmNumber],
211              *Tuning.Settings[Tuning.CurrentParmNumber].Value);
212         LogStop();
213     }
214
215
```

© Southwestern Bell Technology Resources, Inc. 1992-1994

APPENDIX B

```
216             /* we did good, now go on */
217             Tuning.Settings[Tuning.CurrentParmNumber].LastChange=0;/*restart*/
218             if(Tuning.CurrentParmNumber==NumTuningParms-1)
219                 Tuning.CurrentParmNumber=0;
220         else
221             Tuning.CurrentParmNumber++;
222         Tuning.MinDecideDuration=max(0,(Average-
223             AverageSumOfDiffs));
224         }
225         else if(Tuning.Settings[Tuning.CurrentParmNumber].LastChange
226             < 0) /* last attempt was in second direction tried */
227     /* put it back and try next parameter */
228         *Tuning.Settings[Tuning.CurrentParmNumber].Value-=
229             Tuning.Settings[Tuning.CurrentParmNumber].LastChange;
230     Config.Calc.ReadSearch =
231         (UINT)(
232         (float)Config.File.Cache_Num_Buffers  / 100. *
233         (float)Config.File.Cache_Read_Preserve_Percent
234         );
235
236     Config.Calc.PreReadSearch =
237         (UINT)(
238         (float)Config.File.Cache_Num_Buffers  / 100. *
239         (float)Config.File.Cache_PreRead_Preserve_Percent
240         );
241
242     Config.Calc.DrainOnReadThreshold=
243         Config.Calc.ReadSearch/2;/*-171-*/
244
245     Tuning.Settings[Tuning.CurrentParmNumber].LastChange=0;/* restart */
246     if(Tuning.CurrentParmNumber==NumTuningParms-1)
247         (
```

© Southwestern Bell Technology Resources, Inc. 1992-1994

APPENDIX B

```
252         ResetDesired=1;
253         Tuning.CurrentParmNumber=0;
254       }
255     else
256         Tuning.CurrentParmNumber++;
257
258     }
259   else if (Tuning.Settings[Tuning.CurrentParmNumber].LastChange
260     > 0)/* try a reduction, last change was positive */
261     {
262
263
264     if((INT)((INT)(*Tuning.Settings[Tuning.CurrentParmNumber].Value)-
265         (INT)(Tuning.Settings[Tuning.CurrentParmNumber].ChangeDelta*2)) >=
266         (INT)Tuning.Settings[Tuning.CurrentParmNumber].MinValue)
267       {
268       /* go ahead and make the change */
269       *Tuning.Settings[Tuning.CurrentParmNumber].Value-=
270             (Tuning.Settings[Tuning.CurrentParmNumber].ChangeDelta*2);
271     Config.Calc.ReadSearch =
272         (UINT)(
273         (float)Config.File.Cache_Num_Buffers  / 100. *
274         (float)Config.File.Cache_Read_Preserve_Percent
275         );
276
277     Config.Calc.PreReadSearch =
278         (UINT)(
279         (float)Config.File.Cache_Num_Buffers  / 100. *
280         (float)Config.File.Cache_PreRead_Preserve_Percent
281         );
282
283     Config.Calc.DrainOnReadThreshold=
284             Config.Calc.ReadSearch/2;/*-171-*/
285
286     Tuning.Settings[Tuning.CurrentParmNumber].LastChange=
287
```

Page 8

© Southwestern Bell Technology Resources, Inc. 1992-1994

APPENDIX B

```
288                            0-Tuning.Settings[Tuning.CurrentParmNumber].ChangeDelta;
289           }
290           else /* cannot change it any more, revert and go on */
291           {
292             *Tuning.Settings[Tuning.CurrentParmNumber].Value-=
293                Tuning.Settings[Tuning.CurrentParmNumber].LastChange;
294             Config.Calc.ReadSearch =
295                (UINT)(
296                (float)Config.File.Cache_Num_Buffers / 100. *
297                (float)Config.File.Cache_Read_Preserve_Percent
298                );
299
300             Config.Calc.PreReadSearch =
301                (UINT)(
302                (float)Config.File.Cache_Num_Buffers / 100. *
303                (float)Config.File.Cache_PreRead_Preserve_Percent
304                );
305
306             Config.Calc.DrainOnReadThreshold=
307                Config.Calc.ReadSearch/2;/*-171-*/
308
309             Tuning.Settings[Tuning.CurrentParmNumber].LastChange=0;/* restart */
310             if(Tuning.CurrentParmNumber==NumTuningParms-1)
311             {
312                ResetDesired=1;
313                Tuning.CurrentParmNumber=0;
314             }
315             else
316                Tuning.CurrentParmNumber++;
317           }
318         }
319         else if (Tuning.Settings[Tuning.CurrentParmNumber].LastChange
320         == 0)/* was 0, try increment */
321         {
322           if(*Tuning.Settings[Tuning.CurrentParmNumber].Value+
323
```

Page 9

© Southwestern Bell Technology Resources, Inc. 1992-1994

APPENDIX B

```
324              Tuning.Settings[Tuning.CurrentParmNumber].ChangeDelta <=
325              Tuning.Settings[Tuning.CurrentParmNumber].MaxValue)
326         {
327         /* go ahead and make the change */
328         *Tuning.Settings[Tuning.CurrentParmNumber].Value=
329              Tuning.Settings[Tuning.CurrentParmNumber].Value+
330              Tuning.Settings[Tuning.CurrentParmNumber].ChangeDelta;
331         Config.Calc.ReadSearch =
332              (UINT)(
333              (float)Config.File.Cache_Num_Buffers   / 100. *
334              (float)Config.File.Cache_Read_Preserve_Percent
335              );
336         Config.Calc.PreReadSearch =
337              (UINT)(
338              (float)Config.File.Cache_Num_Buffers   / 100. *
339              (float)Config.File.Cache_PreRead_Preserve_Percent
340              );
341         Config.Calc.DrainOnReadThreshold=
342              Config.Calc.ReadSearch/2;/*-171-*/
343         Tuning.Settings[Tuning.CurrentParmNumber].LastChange=
344              Tuning.Settings[Tuning.CurrentParmNumber].ChangeDelta;
345         }
346    else if(((INT)((INT)(*Tuning.Settings[Tuning.CurrentParmNumber].Value)-
347              (INT)(Tuning.Settings[Tuning.CurrentParmNumber].ChangeDelta)) >=
348              (INT)(Tuning.Settings[Tuning.CurrentParmNumber].MinValue))
349         {
350         /* could not increase, try decrease first */
351         *Tuning.Settings[Tuning.CurrentParmNumber].Value-=
352              Tuning.Settings[Tuning.CurrentParmNumber].ChangeDelta;
353         Config.Calc.ReadSearch =
354              (UINT)(
355              (float)Config.File.Cache_Num_Buffers   / 100. *
356              (float)Config.File.Cache_Read_Preserve_Percent
```

APPENDIX B

```
360         );
361
362     Config.Calc.PreReadSearch =
363         (UINT)(
364             (float)Config.File.Cache_Num_Buffers  / 100. *
365             (float)Config.File.Cache_PreRead_Preserve_Percent
366         );
367
368     Config.Calc.DrainOnReadThreshold=
369         Config.Calc.ReadSearch/2;/*-171-*/
370
371     Tuning.Settings[Tuning.CurrentParmNumber].LastChange=
372         0-Tuning.Settings[Tuning.CurrentParmNumber].ChangeDelta;
373     }
374     else /* go to next parm, this one is stuck */
375     {
376         Tuning.Settings[Tuning.CurrentParmNumber].LastChange=0;
377         if(Tuning.CurrentParmNumber==NumTuningParms-1)
378         {
379             ResetDesired=1;
380             Tuning.CurrentParmNumber=0;
381         }
382         else
383             Tuning.CurrentParmNumber++;
384     }
385 if(Tuning.MinDecideDuration == 0)/*-336-*/
386 {
387     Tuning.MinDecideDuration=max(0,(Average-
388         AverageSumOfDiffs));/*-268- was /3 of diffs */
389 }
390 if(Tuning.Settings[Tuning.CurrentParmNumber].LastChange==0 &&
391     (Average < 8000 || Average > 12000))
392 {
393     Tuning.SampleSize=max(1000,min(30000,
394         10000*Tuning.SampleSize/Average));/*-189-,-190-*/
```

Page 11

© Southwestern Bell Technology Resources, Inc. 1992-1994

APPENDIX B

```
396                    if(PriorSampleSize != Tuning.SampleSize)
397                    (
398                        PriorSampleSize=Tuning.SampleSize;
399                    )
400                )
401            )
402        )
403    )
404    )
405    Tuning.ThisMixRatio=0;
406    Tuning.ThisDuration=0;/* reset */
407
408
409
410
411    DosReleaseMutexSem(Tuning.Lock);
412    )
413    else
414    DosReleaseMutexSem(Tuning.Lock);
415    )
416
417
```

Page 12

© Southwestern Bell Technology Resources, Inc. 1992-1994

What is claimed is:

1. A data processing system comprising:

a processor that operates on various data, said processor comprising a processor memory and means for specifying an address that corresponds to a requested data block located within another memory to be accessed by said processor;

a hierarchical memory system comprising a cache and a long-term storage; and a storage control processor comprising:

means for providing processor access to said requested data block within said cache;

means for transferring data between said processor memory and said cache; and means for transferring data between said cache and said long-term storage;

said data processing system further comprising a tuning mechanism for automatically and continuously tuning tunable parameters of said storage control processor, said tuning mechanism comprising:

means for measuring durations of I/O processing events being performed by said storage control processor to obtain sample sets based upon the measured durations;

means for obtaining a first sample set;

means for changing a parameter of said storage control processor by incrementing or decrementing the value of said parameter by a pre-defined delta value after the first sample set is obtained;

means for obtaining a second sample set after the parameter has been changed by said changing means;

means for comparing the I/O processing events measured to obtain the first sample set to the I/O processing events measured to obtain the second sample set in order to determine if the mixtures of I/O processing events are similar;

means, operable when the first and second sample sets have similar I/O processing event mixtures, for determining if there was an overall decrease in the lengths of I/O processing event durations being measured after the parameter was changed;

means for maintaining the parameter change, if it is determined that there was an overall decrease in the lengths of I/O processing event durations after the parameter was changed; and means for setting the tuning mechanism to tune a next tunable parameter of said storage control processor after said maintaining means has maintained a parameter change.

2. The data processing system according to claim 1, wherein said durations comprise wall-time durations of each I/O processing event.

3. The data processing system according to claim 1, wherein each I/O processing event comprises a processing of a channel command by a channel command interpreter provided in said storage control processor.

4. The data processing system according to claim 1, wherein said measuring means comprises means for accumulating the measured durations of I/O processing events to form an accumulated duration sample, each sample set comprising a limited number of accumulated duration samples.

5. The data processing system according to claim 4, wherein each sample set comprises three accumulated duration samples.

6. The data processing system according to claim 4, wherein each accumulated duration sample is formed by accumulating approximately 1000 I/O processing event durations.

7. The data processing system according to claim 1, further comprising means for forming an I/O event mixture value which represents the types of I/O processing events which are being measured by said measuring means, a first I/O event mixture value being formed based upon said first sample set, and a second I/O event mixture value being formed based upon said second sample set, said comparing means comprising event mixture comparing means for comparing the first I/O mixture value with the second I/O event mixture value in order to determine if the first and second sample sets have similar I/O event mixtures.

8. The data processing system according to claim 4, wherein said determining means further comprises means for comparing an accumulated duration sample of said second sample set to an accumulated duration sample of said first sample set.

9. The data processing system according to claim 1, wherein said changing means comprises means for inhibiting changing of a parameter of said storage control processor when such a change would bring the parameter outside of a predetermined allowed range for that parameter.

10. The data processing system according to claim 1, further comprising means for continuously setting the tuning mechanism to tune another tunable parameter, and means for reinitiating operation of said tuning mechanism to tune the other tunable parameter.

11. The data processing system according to claim 1, wherein said changing means comprises means for reverting the parameter change if it is determined that there was no overall decrease in the lengths of I/O processing event durations after the parameter was changed in one direction and in an opposite direction.

12. The data processing system according to claim 1, wherein each of the mixtures of I/O events for each sample set is represented by a mix ratio accumulated value for each sample, said mix ratio accumulated value being formed by accumulating into an accumulator a predetermined value when one type of I/O event is measured by said measuring means, and subtracting from said accumulator a predetermined value when another type of I/O event is measured by said measuring means.

13. The data processing system according to claim 12, wherein said one type of I/O event comprises a write operation being performed by said storage control processor, and wherein said other type of I/O event comprises a read operation being performed by said storage control processor.

14. The data processing system according to claim 12, wherein said comparing means comprises mix ratio hypothesis testing means for calculating a relationship between the mix ratio accumulated values of the first sample set and the mix ratio accumulated values of the second sample set, as a function of the variability of the mix ratio accumulated values of one of the first and second sample sets and the respective means of the mix ratio accumulated values of each set.

15. The data processing system according to claim 14, wherein the variability $x_\overline{x}$ of a given sample set is the mean of the absolute deviations from the mean x of the mix ratio accumulated values in the given sample set.

16. The data processing system according to claim 15, wherein said mix ratio hypothesis testing means comprises means for determining whether or not the following condition is true:

$$(\bar{x}-n x_{\bar{x}})_{first\ set} \leq (\bar{x})_{second\ set} \leq (\bar{x}+m x_{\bar{x}})_{first\ set}$$

wherein m and n represent predetermined multiples of the absolute deviations from the mean $\bar{x}$ of the mix ratio accumulated values in the given sample set.

17. The data processing system according to claim 4, wherein said determining means, for determining if there was an overall decrease in the lengths of I/O processing event durations being measured, comprises accumulated duration hypothesis testing means for calculating a relationship between the accumulated duration samples of the first sample set and the accumulated duration samples of the second sample set, as a function of the variability of the accumulated duration samples of one of the first and second sample sets and the respective means of the accumulated duration samples of each set.

18. The data processing system according to claim 17, wherein the variability $x_{\bar{x}}$ of a given sample set is the mean of the absolute deviations from the mean $\bar{x}$ of the accumulated duration samples in the given sample set.

19. The data processing system according to claim 17, wherein said accumulated duration hypothesis testing means comprises means for determining if the following relationship is true:

$$(\bar{x})_{second\ set} < (\text{larger of 0 and } \bar{x}-n x_{\bar{x}})_{first\ set}$$

wherein n represents a predetermined multiple of the absolute deviations from the mean $\bar{x}$ of the mix ratio accumulated values in the given sample set.

20. The data processing system according to claim 1, wherein said storage control processor comprises a mainframe storage controller.

21. The data processing system according to claim 1, wherein said storage control processor comprises pre-fetch means for making data blocks available within said cache for future access by said processor, said pre-fetch means comprising physical pre-read means, responsive to a request made by said processor for access to a specified data block, for performing a physical read from said long-term storage of up to a pre-read count number of data blocks, and wherein said pre-read count is one of said tunable parameters tuned by said tuning mechanism.

22. The data processing system according to claim 1, wherein said data processing system further comprises defining means for defining a search portion of a listing which identifies as updated those buffers that have been written to from said processor, wherein when a physical read request is made which comprises a required read request initiated by said processor, a searched portion of said listing is limited to a first number of unpreserved cache buffers, and wherein when a physical read request is made which comprises a pre-read request initiated by said storage control processor, a searched portion of said listing is limited to a second number of unpreserved cache buffers.

23. The data processing system according to claim 22, wherein said first number of unpreserved cache buffers and said second number of unpreserved cache buffers are determined based upon at least one cache buffer preserved parameter, each of which is among said tunable parameters tuned by said tuning mechanism.

24. The data processing system according to claim 23, wherein said at least one cache buffer preserve parameter comprises a first cache buffer preserve parameter utilized to set said first number of unpreserved cache buffers, and wherein said at least one cache buffer preserve parameter comprises a second cache buffer preserve parameter utilized to set said second number of unpreserved cache buffers.

25. The data processing system according to claim 24, wherein said first cache buffer preserve parameter comprises a percent of cache buffers within said listing to be preserved when performing a required read, and wherein said second cache buffer preserve parameter comprises a percent of cache buffers within said listing to be preserved when performing a preread.

26. A method for tuning a storage control processor provided in a data processing system, said data processing system comprising a processor that operates on various data, wherein said processor comprises a processor memory and specifies an address that corresponds to a requested data block located within another memory to be accessed by said processor, said data processing system further comprising a hierarchical memory system comprising a cache and a long-term storage, said storage control processor providing processor access to said requested data block within said cache, transferring data between said processor memory and said cache, and transferring data between said cache and said long-term storage, said method comprising:

measuring durations of I/O processing events being performed by said storage control processor to obtain sample sets based upon the measured durations;

obtaining a first sample set;

changing a parameter of said storage control processor by incrementing or decrementing the value of said parameter by a predefined delta value after the first sample set is obtained;

obtaining a second sample set after the parameter has been changed by said changing means;

comparing the I/O processing events measured to obtain the first sample set to the I/O processing events measured to obtain the second sample set in order to determine if the mixtures of I/O processing events are similar;

determining, when the first and second sample sets have similar I/O processing event mixtures, if there was an overall decrease in the length of I/O processing event duration being measured after the parameter was changed;

maintaining the parameter change, if it is determined that there was an overall decrease in the lengths of I/O processing event durations after the parameter was changed; and commencing tuning of a next tunable parameter of said storage control processor after a parameter change has been maintained.

27. The method according to claim 26, wherein said durations comprise wall-time durations of each I/O processing event.

28. The method according to claim 26, wherein each I/O processing event comprises a processing of a channel command by a channel command interpreter provided in said storage control processor.

29. The method according to claim 26, wherein said measuring comprises accumulating the measured durations of I/O processing events to form an accumulated duration sample, each sample set comprising a limited number of accumulated duration samples.

30. The method according to claim 29, wherein each sample set comprises three accumulated duration samples.

31. The method according to claim 29, wherein each accumulated duration sample is formed by accumulating approximately 1000 I/O processing event durations.

32. The method according to claim 26, further comprising an I/O event mixture value which represents the type of I/O processing events which are being measured, a first I/O event mixture value being formed based upon said first sample set, and a second I/O event mixture value being formed based upon said second sample set, said comparing step comprising comparing the first I/O mixture value with the second I/O mixture value in order to determine if the first and second sample sets have similar I/O event mixtures.

33. The method according to claim 29, wherein said determining step further comprises comparing an accumulated duration sample of said second sample set to an accumulated duration sample of said first sample set.

34. The method according to claim 26, wherein said changing step comprises inhibiting changing of a parameter of said storage control processor when such a change would bring the parameter outside of a predetermined allowed range for that parameter.

35. The method according to claim 26, further comprising reinitiating operation of said method for tuning to tune another tunable parameter.

36. The method according to claim 26, wherein said changing comprises reverting the parameter change, if it is determined that there was no overall decrease in the lengths of I/O processing event durations after the parameter was changed in one direction and in an opposite direction.

37. The method according to claim 26, wherein each of the mixtures of I/O events for each sample set is represented by a mix ratio accumulated value for each sample, which is formed by accumulating into an accumulator a predetermined value when one type of I/O event is measured, and by substracting from said accumulator a predetermined value when another type of I/O event is measured.

38. The method according to claim 37, wherein said one type of I/O event comprises a write operation being performed by said storage control processor, and wherein said other type of I/O event comprises a read operation being performed by said storage control processor.

39. The method according to claim 37, wherein said comparing comprises mix ratio hypothesis testing which includes calculating a relationship between the mix ratio accumulated values of the first sample set and the mix ratio accumulated values of the second sample set, as a function of the variability of the mix ratio accumulated values of one of the first and second sample sets and the respective means of the mix ratio accumulated values of each set.

40. The method according to claim 39, wherein the variability $X_{\bar{x}}$ of a given sample set is the mean of the absolute deviations from the mean $\bar{x}$ of the mix ratio accumulated values in the given sample set.

41. The method according to claim 38, wherein said mix ratio hypothesis testing comprises determining whether or not the following condition is true:

$$(\bar{x}-nx_{\bar{x}})_{first\ set} \leq (\bar{x})_{second\ set} \leq (\bar{x}+mx_{\bar{x}})_{first\ set}$$

wherein m and n represent predetermined multiples of the absolute deviations from the mean $\bar{x}$ of the mix ratio accumulated values in the given sample set.

42. The method according to claim 29, wherein said step of determining if there was an overall decrease in the lengths of I/O processing event durations being measured comprises performing accumulated duration hypothesis testing which includes calculating a relationship between the accumulated duration samples of the first sample set and the accumulated duration samples of the second sample set, as a function of the variability of the accumulated duration samples of one of the first and second sample sets and the respective means of the accumulated duration samples of each set.

43. The method according to claim 42, wherein the variability $x_{\bar{x}}$ of a given sample set is the mean of the absolute deviations from the mean $\bar{x}$ of the accumulated duration samples in the given sample set.

44. The method according to claim 43, wherein said accumulated duration hypothesis testing comprises determining if the following relationship is true:

$$(\bar{x})_{second\ set} = (\text{larger of 0 and } \bar{x}-nx_{\bar{x}})_{first\ set}$$

wherein n represents a predetermined multiple of the absolute deviations from the mean $\bar{x}$ of the mix ratio accumulated values in the given sample set.

45. The method according to claim 26, wherein said storage control processor comprises a mainframe storage controller.

46. The method according to claim 26, wherein said storage control processor comprises pre-fetch means for making data blocks available within said cache for future access by said processor, said pre-fetch means comprising physical preread means, responsive to a request made by said processor for access to a specified data block, for performing a physical read from said long-term storage of up to a pre-read count number of data blocks, and wherein said pre-read count is one of said tunable parameters tuned by said tuning method.

47. The method according to claim 26, wherein said data processing system further comprises defining means for defining a search portion of a listing which identifies as updated those buffers that have been written to from said processor, wherein when a physical read request is made which comprises a required read request initiated by said processor, a searched portion of said listing is limited to a first number of unpreserved cache buffers, and wherein when a physical read request is made which comprises a pre-read request initiated by said storage control processor, a searched portion of said listing is limited to a second number of unpreserved cache buffers.

48. The method according to claim 47, wherein said first number of unpreserved cache buffers and said second number of unpreserved cache buffers are determined based upon at least one cache buffer preserve parameter, each of which is among said tunable parameters tuned by said method for tuning.

49. The method according to claim 48, wherein said at least one cache buffer preserve parameter comprises a first cache buffer preserve parameter utilized to set said first number of unpreserved cache buffers, and wherein said at least one cache buffer preserve parameter comprises a second cache buffer preserve parameter utilized to set said second number of unpreserved cache buffers.

50. The method according to claim 49, wherein said first cache buffer preserve parameter comprises a percent of cache buffers within said listing to be preserved when performing a required read, and wherein said second cache buffer preserve parameter comprises a percent of cache buffers within said listing to be preserved when performing a pre-read.

51. A data processing system comprising:
a processor that operates on various data, said processor comprising a processor memory and means for specifying an address that corresponds to a requested data block located within another memory to be accessed by said processor;

a hierarchical memory system comprising a cache and a long-term storage;

a storage control processor comprising means for providing processor access to said requested data block within said cache, means for transferring data between said processor memory and said cache, and means for transferring data between said cache and said long-term storage;

drain means for draining said cache by writing a plurality of blocks from said cache to said long-term storage upon the occurrence of a predetermined event; and a tuning mechanism for automatically and continuously controlling whether said drain means is ON or OFF, said tuning mechanism comprising:

means for determining if the current amount of updated buffers in said cache exceeds a drain threshold value:

means for turning said drain means ON when the current amount of updated buffers exceeds the drain threshold value; and means for turning said drain means OFF when the current amount of updated buffers does not exceed the drain threshold value; and means for determining when said storage control processor has instructed a physical read of data from said long-term storage to said cache, wherein said predetermined event comprises a determination that said storage control processor has instructed a physical read of data from said long-term storage to said cache.

52. The data processing system according to claim 51, wherein said drain threshold value equals a drain-on-read threshold value.

53. The data processing system according to claim 51, wherein said drain threshold value equals a proportion of a drain-on-read threshold value.

54. A data processing method utilizing a processor that operates on various data, said processor comprising a processor memory and specifying an address that corresponds to a requested data block located within another memory to be accessed by said processor, said data processing method further utilizing a hierarchical memory system comprising a cache and a long-term storage, said data processing method comprising:

performing storage control processing including providing processor access to said requested data block within said cache, transferring data between said processor memory and cache, and transferring data between said cache and said long-term storage;

draining said cache by writing a plurality of blocks from said cache to said long-term storage upon the occurrence of a predetermined event said draining being controlled by:

determining if the current amount of updated buffers in said cache exceeds a drain threshold value;

controlling said draining to be performed when the current amount of updated buffers exceeds the drain threshold value; and controlling said draining to not be performed when the current amount of updated buffers does not exceed the drain threshold value;

automatically and continuously controlling whether said step of draining is performed or not; and determining when said storage control processor has instructed a physical read of data from said long-term storage to said cache, wherein said predetermined event comprises a determination that said storage control processor has instructed a physical read of data from said long-term storage to said cache.

55. The data processing method according to claim 54, wherein said drain threshold value equals a drain-on-read threshold value.

56. A tuning system for automatically tuning tunable parameters of a storage control processor provided in a data processing system, said data processing system having a cache and a long-term storage, said tuning system comprising:

means for measuring durations of I/O processing events being performed by said storage control processor;

means for accumulating said I/O processing events into a predetermined n umber of sample sets;

means for performing a statistical evaluation of the I/O performance of said storage control processor based upon the measured durations of said predetermined number of sample sets, said means for performing said statistical evaluation comprising;

means for obtaining a first sample set, means for changing a parameter of said storage control processor by incrementing or decrementing the value of said parameter by a predefined delta value after the first sample set is obtained;

means for obtaining a second sample set after the parameter has been changed by said changing means:

means for comparing the I/O processing events measured to obtain the first sample set to the I/O processing events measured to obtain the second sample set in order to determine if the mixtures of I/O processing events are similar; and means for determining when the first and second sample sets have similar I/O processing event mixtures, if there was an overall decrease in the length of I/O processing event duration being measured after the parameter was changed; and means for modifying a tunable parameter based upon said statistical evaluation of said predetermined number of sample sets.

57. A data processing system comprising:

a processor that operates on various data, said processor comprising a processor memory and means for specifying an address that corresponds to a requested data block located within another memory to be accessed by said processor;

a hierarchical memory system comprising a cache and a long-term storage;

a storage control processor comprising means for providing processor access to said requested data block within said cache, means for transferring data between said processor memory and said cache, and means for transferring data between said cache and said long-term storage;

drain means for draining said cache by writing a plurality of blocks from said cache to said long-term storage upon the occurrence of a predetermined event;

a tuning mechanism for automatically and continuously controlling whether said drain means is ON or OFF, said tuning mechanism comprising:

means for determining if the current amount of updated buffers in said cache exceeds a drain threshold value;

means for turning said drain means ON when the current amount of updated buffers exceeds the drain threshold value; and means for turning said drain means OFF when the current amount of updated buffers does not exceed the drain threshold value; and means for determining when said storage control processor has instructed a physical write of data from said cache to long-term storage, wherein said predetermined event comprises a determination that said storage control processor has instructed a physical write of data from said cache to said long-term storage.

58. The data processing system according to claim 57, wherein said drain threshold value equals a proportion of a drain-on-read threshold value.

59. The data processing method according to claim 58, wherein said drain threshold value equals a proportion of a drain-on-read threshold value.

60. A data processing method utilizing a processor that operates on various data, said processor comprising a processor memory and specifying an address that corresponds to a requested data block located within another memory to be accessed by said processor, said data processing method further utilizing a hierarchical memory system comprising a cache and a long-term storage, said data processing method comprising:

performing storage control processing including providing processor access to said requested data block within said cache, transferring data between said processor memory and cache, and transferring data between said cache and said long-term storage;

draining said cache by writing a plurality of blocks from said cache to said long-term storage upon the occurrence of a predetermined event, said draining being controlled by:

determining if the current amount of updated buffers in said cache exceeds a drain threshold value;

controlling said draining to be performed when the current amount of updated buffers exceeds the drain threshold value; and controlling said draining to not be performed when the current amount of updated buffers does not exceed the drain threshold value;

automatically and continuously controlling whether said step of draining is performed or not; and determining when said storage control processor has instructed a physical write of data from said cache to long-term storage, wherein said predetermined event comprises a determination that said storage control processor has instructed a physical write of data from said cache to said long-term storage.

61. A data processing system comprising:

a processor that operates on various data, said processor comprising a processor memory and a mechanism which specifies an address that corresponds to a requested data block located within another memory to be accessed by said processor;

a hierarchical memory system comprising a cache and a long-term storage;

a storage control processor comprising an I/O process which provides access to said requested data block within said cache, and transfers data between said processor memory and said cache, and an I/O device driver which transfers data between said cache and said long-term storage; and a tuning mechanism which automatically and continuously tunes tunable parameters of said storage control processor, wherein said tuning mechanism measures durations of I/O processing events performed by said storage control processor to obtain sample sets based upon the measured durations, obtains a first sample set, changes a parameter of said storage control processor by incrementing or decrementing the value of said parameter by a pre-defined delta value after the first sample set is obtained, obtains a second sample set after the parameter has been changed, compares the I/O processing events measured to obtain the first sample set with the I/O processing events measured to obtain the second sample set in order to determine if the mixtures of I/O processing events are similar, determines if there was an overall decrease in the lengths of I/O processing event durations being measured after the parameter was changed when the first and second sample sets have similar I/O processing event mixtures, maintains the parameter change if it is determined that there was an overall decrease in the lengths of I/O processing event durations after the parameter was changed, and tunes a next tunable parameter of said storage control processor after maintaining a parameter change.

62. The data processing system according to claim 61, wherein said durations comprise wall-time durations of each I/O processing event.

63. The data processing system according to claim 61, wherein each I/O processing event comprises a processing of a channel command by a channel command interpreter provided in said storage control processor.

64. The data processing system according to claim 61, wherein said tuning mechanism accumulates the measured durations of I/O processing events to form an accumulated duration sample, each sample set comprising a limited number of accumulated duration samples.

65. The data processing system according to claim 61, wherein said tuning mechanism forms an I/O event mixture value which represents the types of I/O processing events which are being measured, a first I/O event mixture value being formed based upon said first sample set, and a second I/O event mixture value being formed based upon said second sample set, and wherein said tuning mechanism compares the first I/O mixture value with the second I/O event mixture value in order to determine if the first and second sample sets have similar I/O event mixtures.

66. The data processing system according to claim 64, wherein said tuning mechanism compares an accumulated duration sample of said second sample set to an accumulated duration sample of said first sample set.

67. The data processing system according to claim 61, wherein said tuning mechanism inhibits the changing of a parameter of said storage control processor when such a change would bring the parameter outside of a predetermined allowed range for that parameter.

68. The data processing system according to claim 61, wherein said tuning mechanism reverts the parameter change to a prior state if it is determined that there was no overall decrease in the lengths of I/O processing event durations after the parameter was changed in one direction and in an opposite direction.

69. The data processing system according to claim 61, wherein each of the mixtures of I/O events for each sample set is represented by a mix ratio accumulated value for each sample, said mix ratio accumulated value being formed by accumulating, in an accumulator, a predetermined value when one type of I/O event is measured, and subtracting from an accumulated value, in said accumulator, a predetermined value when another type of I/O event is measured.

70. The data processing system according to claim 69, wherein said one type of I/O event comprises a write operation being performed by said storage control processor, and wherein said other type of I/O event comprises a read operation being performed by said storage control processor.

71. The data processing system according to claim 69, wherein said tuning mechanism determines a mix ratio hypothesis test, to calculate a relationship between the mix ratio accumulated values of the first sample set and the mix ratio accumulated values of the second sample set, as a function of the variability of the mix ratio accumulated values of one of the first and second sample sets and the respective mix ratio accumulated values of each set.

72. The data processing system according to claim 71, wherein the variability $x_{\bar{x}}$ of a given sample set is the mean of the absolute deviations from the mean $\bar{x}$ of the mix ratio accumulated values in the given sample set.

73. The data processing system according to claim 72, wherein said tuning mechanism determines whether the following condition is true in accordance with said mix ratio hypothesis test:

$$(\bar{x}-nx_{\bar{x}})_{first\ set} \leq (\bar{x})_{second\ set} \leq (\bar{x}+mx_{\bar{x}})_{first\ set},$$

wherein m and n represent predetermined multiples of the absolute deviations from the mean $\bar{x}$ of the mix ratio accumulated values in the given sample set.

74. The data processing system according to claim 64, wherein said tuning mechanism determines if there was an overall decrease in the lengths of I/O processing event durations being measured by performing an accumulated duration hypothesis test to calculate a relationship between the accumulated duration samples of the first sample set and the accumulated duration samples of the second sample set, said accumulated duration hypothesis test being a function of the variability of the accumulated duration samples of one of the first and second sample sets and the accumulated duration samples of each set.

75. The data processing system according to claim 74, wherein the variability $x_{\bar{x}}$ of a given sample set is the mean of the absolute deviations from the mean $\bar{x}$ of the accumulated duration samples in the given sample set.

76. The data processing system according to claim 74, wherein said tuning mechanism determines if the following relationship is true in accordance with said accumulated duration hypothesis test:

$$(\bar{x})_{second\ set} < (\text{larger of 0 and } \bar{x}-nx_{\bar{x}})_{first\ set},$$

wherein n represents a predetermined multiple of the absolute deviations from the mean $\bar{x}$ of the mix ratio accumulated values in the given sample set.

77. The data processing system according to claim 61, wherein said storage control processor comprises a pre-fetch device which makes data blocks available within said cache for future access by said processor, said pre-fetch device being responsive to a request made by said processor for access to a specified data block to perform a physical read from said long-term storage of up to a pre-read count number of data blocks, and wherein said pre-read count is one of said tunable parameters tuned by said tuning mechanism.

78. The data processing system according to claim 61, wherein said data processing system searches a portion of a listing which identifies as updated those buffers that have been written to said processor, wherein when a physical read request is made which comprises a required read request initiated by said processor, a searched portion of said listing is limited to a first number of unpreserved cache buffers, and wherein when a physical read request is made which comprises a pre-read request initiated by said storage control processor, a searched portion of said listing is limited to a second number of unpreserved cache buffers.

79. The data processing system according to claim 78, wherein said first number of unpreserved cache buffers and said second number of unpreserved cache buffers are determined based upon at least one cache buffer preserved parameter, each of which is among said tunable parameters tuned by said tuning mechanism.

80. The data processing system according to claim 79, wherein said at least one cache buffer preserve parameter comprises a first cache buffer preserve parameter utilized to set said first number of unpreserved cache buffers, and wherein said at least one cache buffer preserve parameter comprises a second cache buffer preserve parameter utilized to set said second number of unpreserved cache buffers.

81. The data processing system according to claim 80, wherein said first cache buffer preserve parameter comprises a percent of cache buffers within said listing to be preserved when performing a required read, and wherein said second cache buffer preserve parameter comprises a percent of cache buffers within said listing to be preserved when performing a pre-read.

82. A data processing system comprising:

a processor that operates on various data, said processor comprising a processor memory and a mechanism which specifies an address that corresponds to a requested data block located within another memory to be accessed by said processor;

a hierarchical memory system comprising a cache and a long-term storage;

a storage control processor which provides processor access to said requested data block within said cache, transfers data between said processor memory and said cache, and transfers data between said cache and said long-term storage;

a draining mechanism which drains said cache by writing a plurality of blocks from said cache to said long-term storage upon the occurrence of a predetermined event; and a tuning mechanism for automatically and continuously controlling whether said draining mechanism is ON or OFF, said tuning mechanism controlling said draining mechanism by determining if the current amount of updated buffers in said cache exceeds a drain threshold value, turning said draining mechanism ON when the current amount of updated buffers exceeds the drain threshold value, and turning said draining mechanism OFF when the current amount of updated buffers does not exceed the drain threshold value; and a device which determine when said storage control processor has instructed a physical read of data from said long-term storage to said cache, wherein said predetermined event comprises a determination that said storage control processor has instructed a physical read of data from said long-term storage to said cache.

83. The data processing system according to claim 82, wherein said drain threshold value equals a drain-on-read threshold value.

84. The data processing system according to claim 83, wherein said drain threshold value equals a proportion of a drain-on-read threshold value.

* * * * *

UNITED STATES PATENT AND TRADEMARK OFFICE
CERTIFICATE OF CORRECTION

PATENT NO. : 5,745,792
DATED : April 28, 1998
INVENTOR(S) : L. JOST

It is certified that error appears in the above-identified patent and that said Letters Patent is hereby corrected as shown below:

At column 54, line 62 (claim 15, line 3) of the printed patent, change "X" to ---$\overline{X}$---.

At column 58, line 12 (claim 44, line 4) of the printed patent, change "=" to ---$<$---.

Signed and Sealed this

Ninth Day of May, 2000

Attest:

Q. TODD DICKINSON

*Attesting Officer*     *Director of Patents and Trademarks*